(12) United States Patent
Shinohara et al.

(10) Patent No.: US 10,119,260 B2
(45) Date of Patent: Nov. 6, 2018

(54) DISCHARGE VALVE APPARATUS, FLUSH WATER TANK APPARATUS, AND FLUSH TOILET

(71) Applicant: TOTO LTD., Kitakyushu-shi, Fukuoka (JP)

(72) Inventors: Koki Shinohara, Kitakyushu (JP); Hideki Tanimoto, Kitakyushu (JP); Yukinori Kubozono, Kitakyushu (JP); Kenji Hatama, Kitakyushu (JP); Hisashi Koga, Kitakyushu (JP)

(73) Assignee: TOTO LTD., Kitakyushu-shi, Fukuoka (JP)

( * ) Notice: Subject to any disclaimer, the term of this patent is extended or adjusted under 35 U.S.C. 154(b) by 303 days.

(21) Appl. No.: 14/812,107

(22) Filed: Jul. 29, 2015

(65) Prior Publication Data

US 2016/0032575 A1 Feb. 4, 2016

(30) Foreign Application Priority Data

Jul. 31, 2014 (JP) .................................. 2014-156543
Apr. 3, 2015 (JP) .................................. 2015-077113

(51) Int. Cl.
*E03D 1/33* (2006.01)
*E03D 1/35* (2006.01)

(52) U.S. Cl.
CPC ................. *E03D 1/33* (2013.01); *E03D 1/35* (2013.01); *Y02A 20/412* (2018.01)

(58) Field of Classification Search
CPC .................................... E03D 1/33; E03D 1/35
USPC ............................................ 4/402, 405, 415
See application file for complete search history.

(56) References Cited

U.S. PATENT DOCUMENTS

2013/0055496 A1* 3/2013 Yyoshioka .............. E03D 1/003
4/324
2013/0283513 A1* 10/2013 Hand ........................ E03D 1/35
4/394

FOREIGN PATENT DOCUMENTS

CN         2379534      5/2000
CN         2527802      12/2002
JP         H06228995    8/1994

* cited by examiner

*Primary Examiner* — Christine Skubinna
(74) *Attorney, Agent, or Firm* — Brooks Kushman P.C.

(57) ABSTRACT

A discharge valve apparatus attached to a reservoir tank in a reservoir tank apparatus for storing flush water. The discharge valve apparatus includes a valve body, attached to the top of a discharge opening provided in the bottom surface of a reservoir tank, for opening and closing the discharge opening by up and down movement thereof, a float, attached to the valve body, which drops in tandem with the drop in water level inside the flush water tank; and a variable drop start timing mechanism to make a drop start timing of the valve body variable.

14 Claims, 20 Drawing Sheets

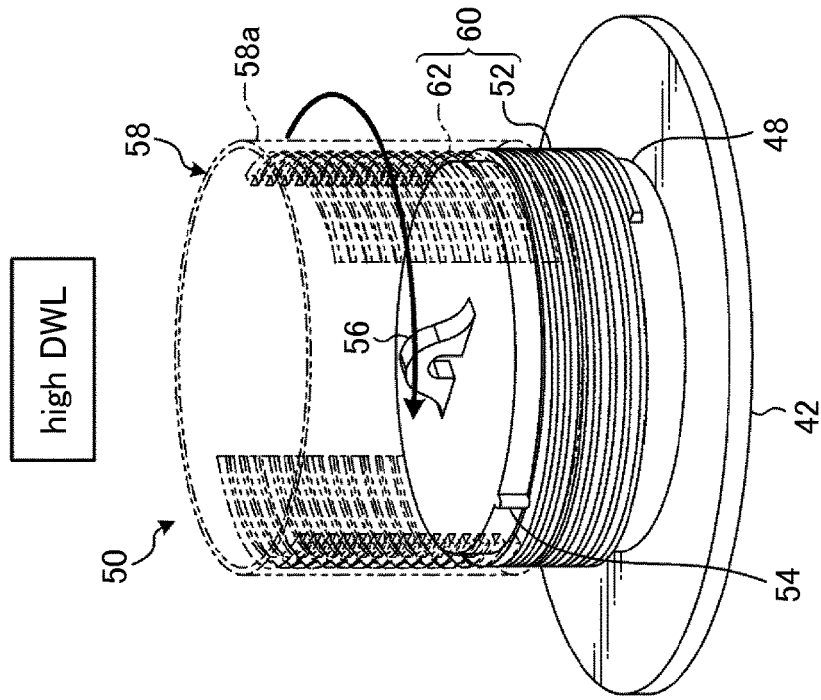
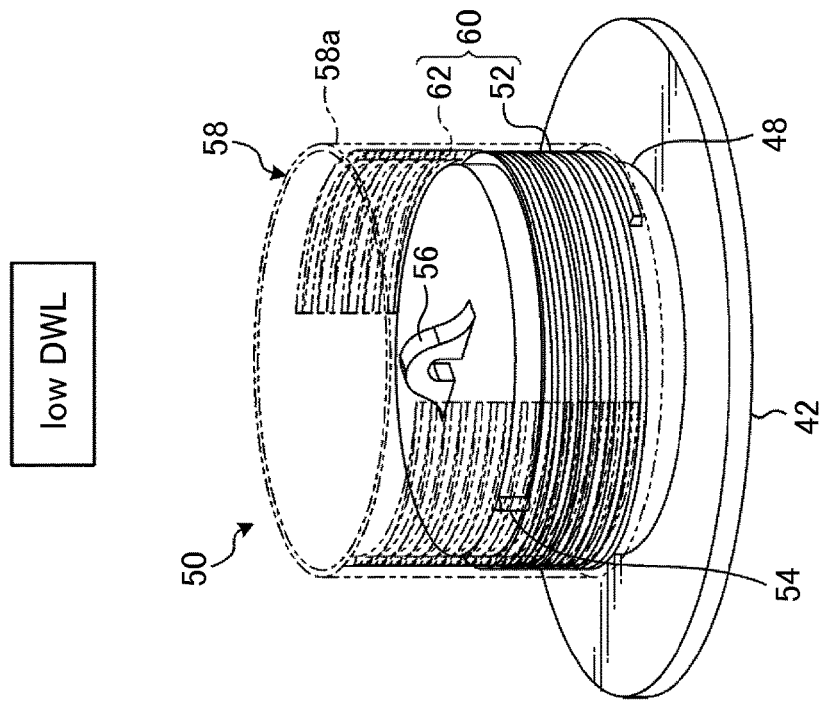
FIG.3

FIG.7
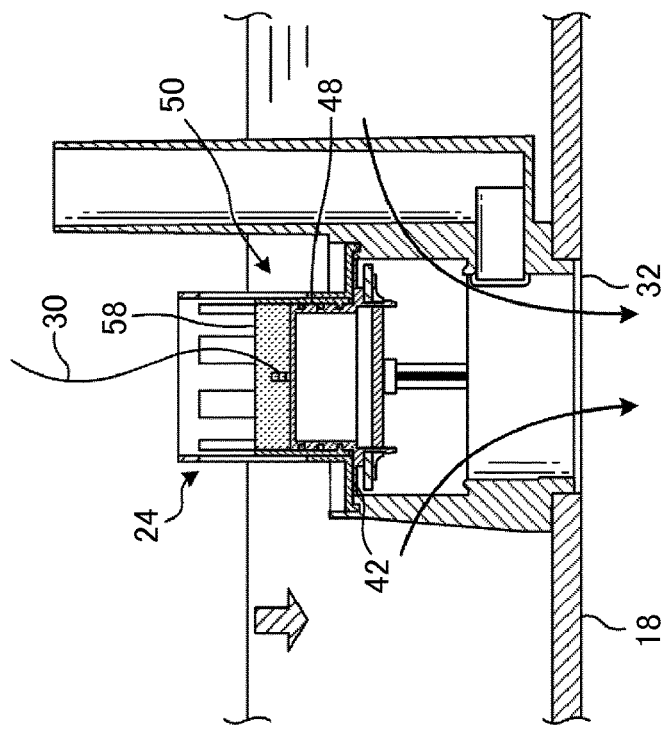
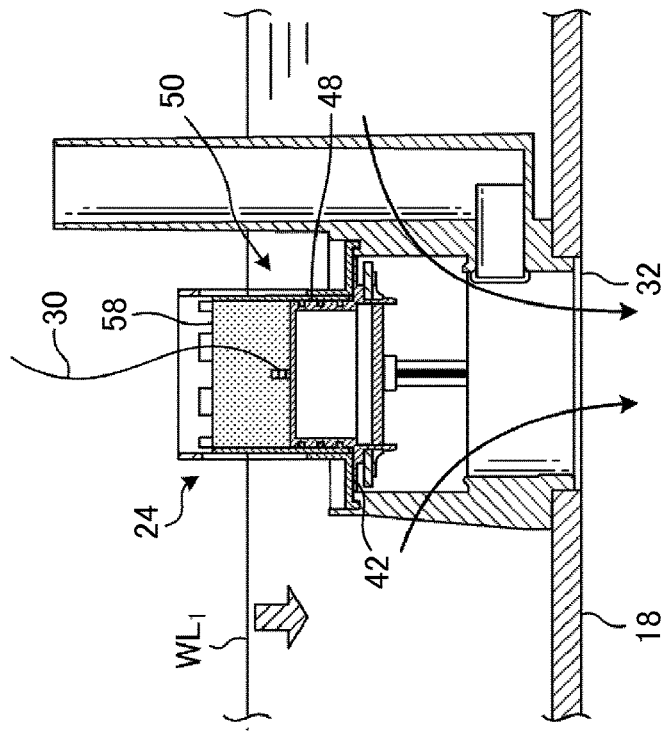

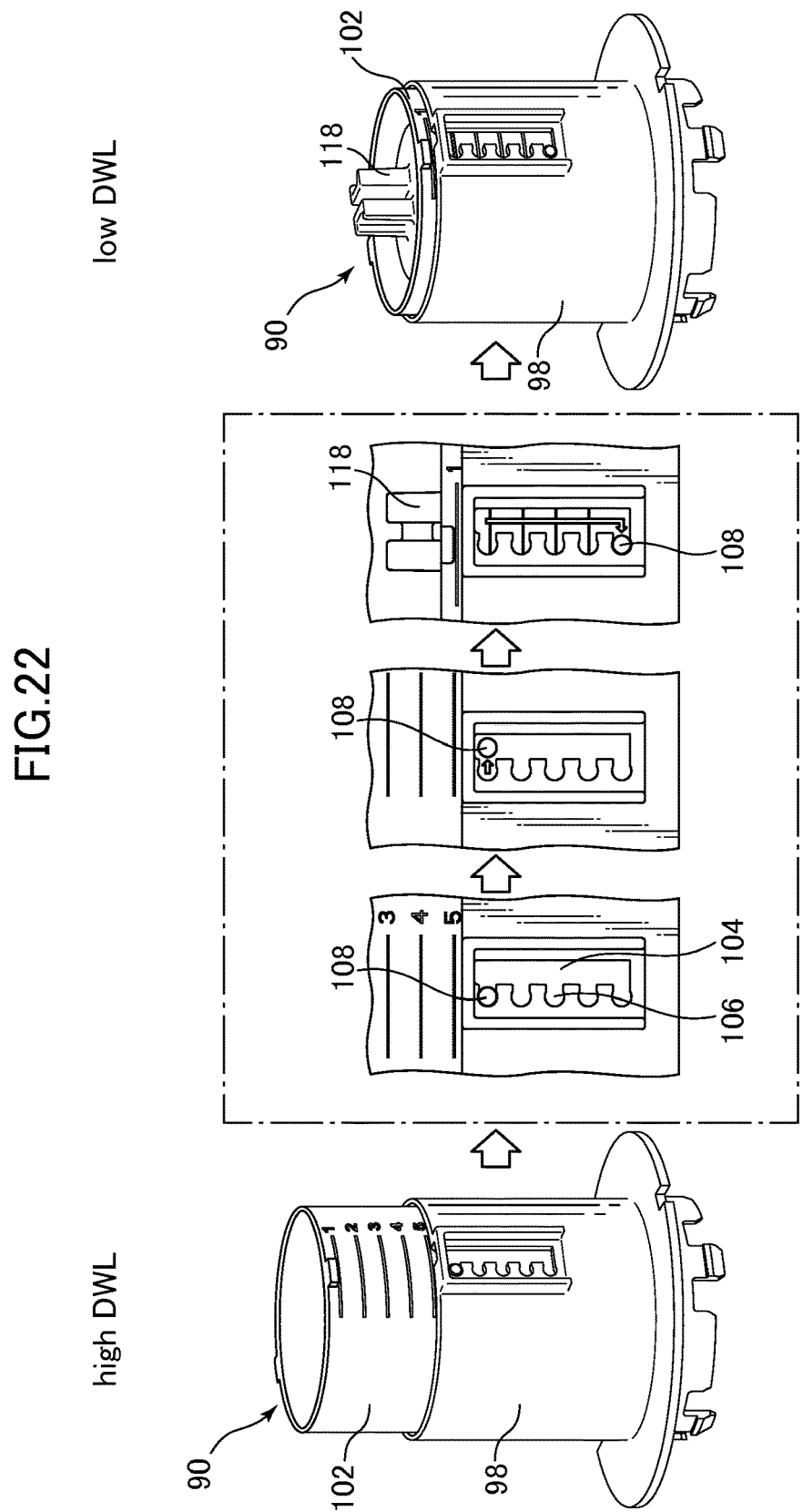

DISCHARGE VALVE APPARATUS, FLUSH WATER TANK APPARATUS, AND FLUSH TOILET

CROSS-REFERENCE TO RELATED APPLICATIONS

This application claims priority to JP application JP 2014-156543 filed on Jul. 31, 2014 and JP application JP 2015-077113 filed on Apr. 3, 2015 the disclosures of which are incorporated in their entirety by reference herein.

TECHNICAL FIELD

The present invention relates to a discharge valve apparatus, a flush water tank apparatus, and a flush toilet.

BACKGROUND

Flush toilets have been known in which the toilet body is flushed using flush water stored in a reservoir tank apparatus. A discharge valve apparatus is used on this reservoir tank apparatus; an example of a discharge valve apparatus is a discharge valve apparatus in which a discharge opening is opened and closed by moving a valve body up or down in the vertical direction relative to a discharge opening in a flush water tank. A known such discharge valve apparatus is one in which a float for causing buoyancy to act on a valve body is integrally formed with the valve body (e.g., see U.S. Pat. No. 8,079,095 (Document 1)).

In the conventional discharge valve apparatus, the valve body drops in the vertical direction in tandem with the descent of the water level inside the flush water tank, hence the time during which the discharge opening is opened by the valve body can be kept essentially constant, and the water level following completion of water discharge (the "dead water level" below) is stable.

SUMMARY

Technical Problem

In the above-described conventional discharge valve apparatus, however, the time during which the discharge port is opened by the valve body is essentially fixed at all times, so that only a predetermined flush water amount can be supplied to the toilet body. Since flush water amounts differ according to toilet type, it was not possible to apply a particular discharge valve apparatus to other types of toilets.

With the trend toward water conservation in recent years, however, a requirement has arisen for toilets having a large flush force with a small flush water amount. Therefore improvements in toilets have been advancing year by year to reduce the amount of flush water. Enabling the adjustment of the flush water amount according to each type of toilet having a differing flush water amount would therefore be economical, since the need to replace discharge valves or flush water tanks to match the particular toilet would be eliminated. Therefore a need has existed not only to increase flush water tank size and enable the adjustment of flush water volume, but also to increase the range of flush water volume adjustment.

The present invention has been made with a view to solving the above problems, and an object of the present invention is to provide a discharge valve apparatus adaptable to other types of toilets by adjusting flush water volume, a reservoir tank apparatus furnished with such a discharge valve apparatus, and a flush water toilet furnished with the reservoir tank apparatus.

Solution to Technical Problem

In order to achieve the aforementioned object, the present invention provides a discharge valve apparatus attached to a reservoir tank in a reservoir tank apparatus for storing flush water, comprising: a valve body, attached to the top of a discharge opening provided in the bottom surface of a reservoir tank, for opening and closing the discharge opening by up and down movement thereof; a float, attached to the valve body, which drops in tandem with the drop in water level inside the flush water tank; and a variable drop start timing mechanism to make a drop start timing of the valve body variable.

In the present invention thus constituted, a variable drop start timing mechanism to make the timing at which a valve body drops variable is attached to a float, which drops in tandem with the drop in water level inside a flush water tank to which a valve body is attached, therefore the timing at which the valve body starts to drop can be changed. As a result, the present invention enables the time over which flush water is discharged from the discharge opening to be changed, and since the flush water volume discharged from the discharge opening can be changed, the apparatus can be attached to toilets of other types, and the flush water volume easily adjusted.

In the present invention, preferably, the variable drop start timing mechanism is a buoyancy adjustment mechanism disposed on the float.

In the present invention thus constituted, a buoyancy adjustment mechanism is mounted on the float, therefore valve body drop start timing can be easily changed using a simple mechanism.

In the present invention, preferably, the variable drop start timing mechanism comprises a reservoir portion for storing flush water, and an adjustment portion for adjusting the volume of the flush water stored in the reservoir portion.

In the present invention thus constituted, using the adjustment portion, buoyancy acting on the float can be easily changed by adjusting the volume of flush water stored in the reservoir portion, which functions as a weight.

In the present invention, preferably, the reservoir portion of the variable drop start timing mechanism has a side wall erected on the outer perimeter side thereof, and the adjustment portion adjusts the flush water volume by changing the height of the reservoir portion side wall.

In the present invention thus constituted, the flush water volume is adjusted by changing the height of the reservoir portion side wall using the adjustment portion of the variable drop start timing mechanism, therefore the buoyancy acting on the float can be easily changed.

In the present invention, preferably, the reservoir portion side wall in the variable drop start timing mechanism enables storage of flush water up to the top edge portion formed around the entire perimeter thereof.

In the present invention thus constituted, the reservoir portion side wall is formed over the entire perimeter, therefore even if flush water which had been stored in the reservoir portion is drained, the flush water is drained uniformly from the reservoir portion, therefore the valve body can be lowered without a loss of valve body balance.

In the present invention, preferably, the reservoir portion adjustment portion of the variable drop start timing mechanism comprises differing channel portions at multiple height positions formed on the float or on the side wall of the reservoir portion, and a projecting portion capable of insertion in the channel portions provided on the side wall or float.

In the present invention thus constituted, by insertion of a raised portion provided on a side wall or float into one of differing channel portions at multiple height positions provided on the float or the reservoir portion side wall, the height position of the top end portion of the reservoir portion side wall can be changed, and adjustment of the start of valve body drop timing and of buoyancy can be accomplished by a simple structure.

In the present invention, preferably, a wall portion extending outward close to the adjustment portion is formed on the float or on the perimeter surface of the reservoir portion side wall, and the outside edge of the wall portion is positioned outside the adjustment portion.

In the invention thus constituted, because the adjustment portion can be prevented by the wall portion from being taken off by coming into contact with some member, the weight of the weight can be reliably adjusted by adjusting the amount of flush water in the reservoir portion using the adjustment portion.

In the present invention, preferably, the wall portion is disposed to surround the adjustment portion.

In the present invention thus constituted, the wall portion surrounds the adjustment portion, therefore breaking off due to contact with the adjustment portion can be reliably prevented.

In the present invention, preferably, the movement in the circumferential direction of the wall portion is restricted so that the valve body does not rotate.

In the present invention thus constituted, the movement in the circumferential direction by the valve body is regulated by the wall portion, therefore the linking member attached to the float can be prevented from turning and twisting.

In the present invention, preferably, the reservoir portion of the variable drop start timing mechanism is formed around the float.

In the present invention thus constituted, the reservoir portion of the variable drop start timing mechanism is formed around the float, therefore the overall apparatus can be given a low-silhouette, compact form.

In the present invention, preferably, the variable drop start timing mechanism is disposed on the float and on the side wall of the reservoir portion, and is a screw mechanism which changes the height of the reservoir portion side wall.

In the present invention thus constituted, the buoyancy acting on the float can be changed with a simple mechanism by changing the height of the side wall of the reservoir portion using a screw mechanism, so that valve body drop start timing can be easily changed.

In the present invention, preferably, the discharge valve apparatus further comprises a guide portion for guiding the up and down motion of the valve body, whereby openings for permitting flush water to flow out are formed in the perimeter wall into which the side walls of the reservoir portion in the guide portion are inserted.

In the present invention thus constituted, the up and down movement of the valve body is guided by the guide portion, so the up and down motion of the valve body can be stabilized. Moreover, openings permitting the outflow of flush water are formed in the perimeter wall of the guide portion into which the side wall of the reservoir portion is inserted, therefore if the side wall is set to be low, for example, excess flush water exceeding the flush water amount set for the reservoir portion can be permitted to flow out from the openings even if flush water exceeding the height of the side wall inside the guide portion is held. As a result, in the present invention exactly the set buoyancy can be made to constantly act on the float, unaffected by the guide portion, and float buoyancy can be maintained at essentially a fixed level.

In the present invention, preferably, the top end of the guide portion opening is formed so that when the valve body reaches the highest position relative to the guide portion, it is positioned higher than the top edge of the reservoir portion side wall.

In the present invention thus constituted, excess flush water exceeding the amount of flush water set for the reservoir portion can be reliably caused to flow out from the opening, which permits exactly the set buoyancy to constantly act on the float, and float buoyancy to be maintained at essentially a fixed level.

In the present invention, preferably, the surface area of the guide portion opening is set to a size such that the water level inside the guide portion drops at essentially the same speed as the drop in the water level inside the flush water tank.

In the present invention thus constituted, excess flush water exceeding the amount of flush water set for the reservoir portion can be caused to flow out from the opening at essentially the same time as the drop in the water level inside the reservoir tank, thus permitting exactly the set buoyancy to constantly act on the float, and the float buoyancy can be maintained at essentially a fixed level.

In the present invention, preferably, the valve body comprises a seal portion for sealing the discharge opening, and a part of the valve body is positioned below the seal portion.

In the present invention thus constituted, a part of the valve body is disposed to be positioned below the seal portion, therefore the overall apparatus can be made compact.

In the present invention, preferably, the valve body comprises a bottom surface, in which a hole is provided.

In the present invention thus constituted, when flush water flows into the float, flush water can be drained from the holes disposed on the bottom surface of the valve body.

In the present invention, preferably, the discharge valve apparatus further comprises a connecting member attachment portion, to which a connecting member for pulling up the valve body to the top surface of the valve body, and the connecting member attachment portion comprises a rotation-limiting portion for limiting the rotational direction of the connecting member to one direction.

In the invention thus constituted, the connecting member rotational direction is restricted to one direction by the connecting member attachment portion, therefore interference between the connecting member and reservoir tank internal members, and tangling of the connecting member itself, can be prevented.

A reservoir tank apparatus of the present invention comprises the above-described discharge valve apparatus.

The reservoir tank apparatus of the present invention comprises the above-described drain valve apparatus.

In the present invention thus constituted, flush water volume can be adjusted in response to toilet type.

BRIEF DESCRIPTION OF THE DRAWINGS

FIG. 3 is a perspective view showing a variable drop start timing mechanism in a discharge valve apparatus according to the first embodiment of the present invention.

FIG. 7 is a view showing the operation of a discharge valve apparatus according to the first embodiment of the present invention.

FIG. 22 is a perspective view showing a drop start timing starting mechanism in a discharge valve apparatus according to the second embodiment of the present invention.

DETAILED DESCRIPTION

Referring to the attached drawings, a discharge valve apparatus, a reservoir tank apparatus, and a flush toilet according to an embodiment of the present invention will be described in detail.

Figure 1:
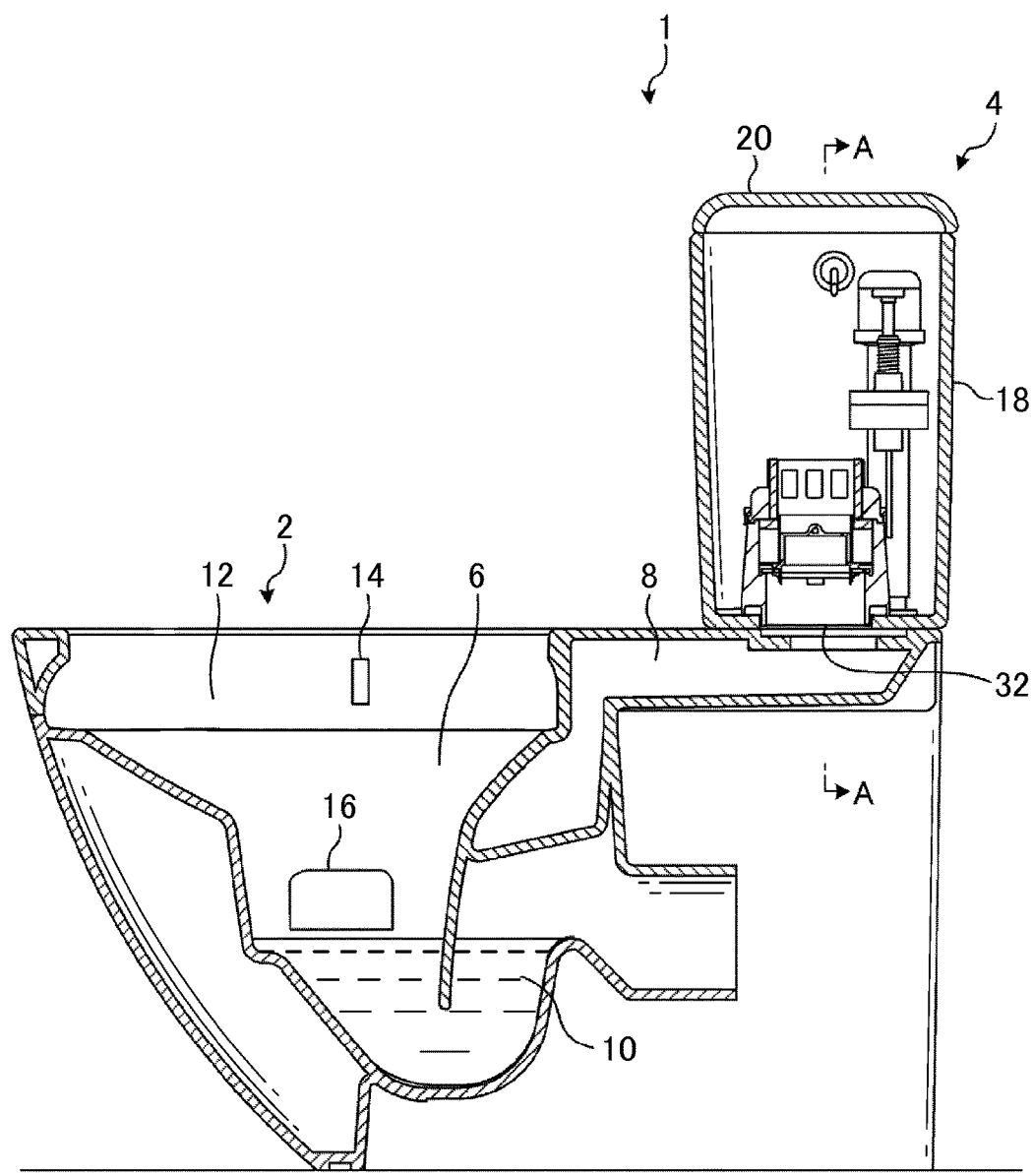
FIG. 1 is a side cross section view showing a flush toilet according to a first embodiment of the present invention.

A discharge valve apparatus, a reservoir tank apparatus, and a flush toilet according to a first embodiment of the present invention will be described based on FIGS. 1 through 4. First, referring to FIG. 1, a flush toilet according to a first embodiment of the present invention will be described. FIG. 1 is a side cross section view showing a flush toilet according to a first embodiment of the present invention.

As shown in FIG. 1, the flush toilet 1 according to the first embodiment of the present invention comprises: a toilet body 2 installed on the floor of a toilet room, and a reservoir tank apparatus 4 installed at the top rear of toilet body 2, for storing flush water supplied to toilet body 2.

The toilet body 2 comprises: a bowl portion 6 for receiving waste, a water conduit 8 for guiding flush water supplied from reservoir tank apparatus 4 into bowl portion 6, and a discharge trap pipe 10, the intake of which is connected to the bottom of bowl portion 6, for discharging waste in bowl portion 6 to an outside discharge pipe (not shown).

The bowl portion 6 comprises: a rim portion 12 which overhangs on the inside of the top edge thereof, a first spout port 7, installed on the left side of the toilet, for spouting flush water supplied from the water conduit 8 toward the front of the toilet, and a second spout port 16, installed on the left side of the toilet at a position above the pooled water surface, for spouting flush water supplied from the water conduit 8 in a lateral direction.

The discharge trap pipe 10 comprises: an ascending path part extending upward from its intake, and a descending path part descending downward from the end of the ascending path part and connected to an external discharge pipe (not shown). Flush water forming a water seal is accumulated from bowl portion 6 to the ascending path part of discharge trap pipe 10. Note that accumulated flush water is referred to as pooled water, and the surface of the pooled water is referred to as the pooled water surface.

The flush toilet 1 is of the so-called wash-down type, in which waste is pushed out by a water flow effect caused by the drop of flush water inside bowl portion 6. In flush toilet 1, flush water spouted forward from first spout port 14 washes bowl portion 6 by dropping as it swirls, and flush water spouted from second spout port 16 swirls in the vertical direction, stirring waste and pushing it toward discharge trap pipe 10. The present invention is not limited to this wash down type of toilet, and may also encompass a siphon or other type of toilet.

Figure 2:
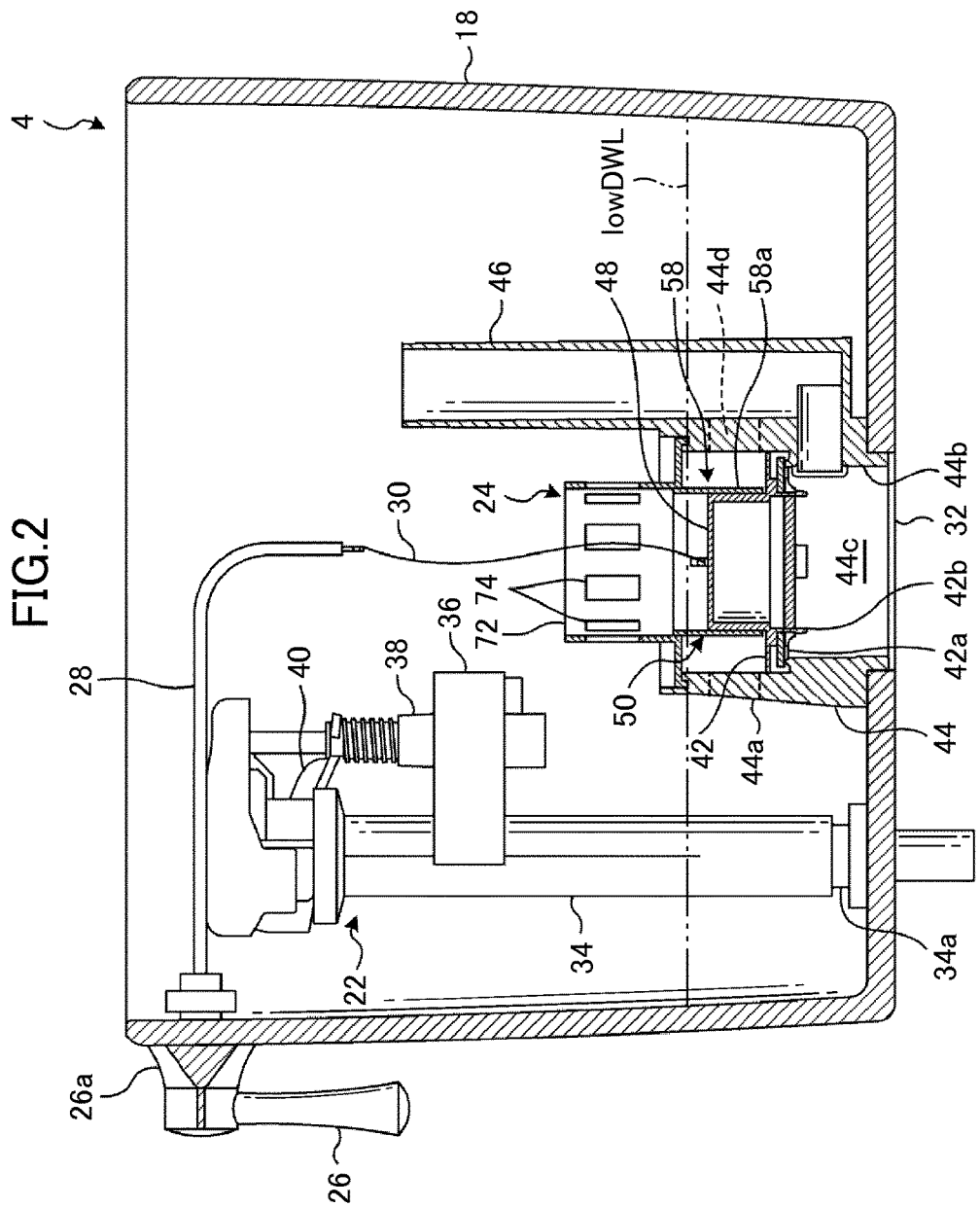
FIG. 2 is a cross section view viewed along a line A-A in FIG. 1.

Next, referring to FIG. 2, a flush water tank apparatus will be described. FIG. 2 is a cross section view viewed along line A-A in FIG. 1. As shown in FIG. 2, the reservoir tank apparatus 4 comprises: a reservoir tank 18 for storing flush water, a lid portion 20 on the reservoir tank 18, a lid portion 20 installed inside reservoir tank 18, and a discharge valve apparatus 24.

As shown in FIG. 2, the reservoir tank 18 is, for example, ceramic, and is an approximately rectangular vessel open at the top. Normally the top opening is closed off by a lid portion 20 (see FIG. 1) made of ceramic, for example. Note that in FIG. 2, an illustration of the lid portion 20 is omitted.

A lever handle 26 is installed on the outside face of the reservoir tank 18. The lever handle 26 rotates about a shaft at its base 26a. Also, on lever handle 26 an approximately L-shaped spindle 28 extends essentially horizontally inside reservoir tank 18, the tip end thereof is bent downward, and is linked by the same shaft as the rotation shaft of lever handle 26. Spindle 28 rotates to what is shown in the figure as the front and rear sides by means of the rotational operation of lever handle 26.

The tip portion of spindle 28 is positioned essentially directly above discharge valve apparatus 24. One end of a bead chain 30 serving as a linking member is connected to the tip portion of the spindle 28. The other end of the bead chain 30 is connected to a float 48, described below, on the discharge valve apparatus 24.

A discharge opening 32 is formed on the bottom surface of reservoir tank 18; this discharge opening 32 joins with reservoir tank apparatus 4 (see FIG. 1) to supply flush water to reservoir tank apparatus 4. Discharge opening 32 is opened and closed by discharge valve apparatus 24.

As shown in FIG. 2, a water supply apparatus 22 is installed inside the reservoir tank 18. The water supply apparatus 22 comprises a water supply pipe 34, a small tank 36, and a water supply float 38. The water supply pipe 34 is connected to a water supply source (not shown) outside the reservoir tank 18, and extends upward from the bottom surface of the reservoir tank 18. Also, a water supply opening 34a for supplying flush water into the reservoir tank 18 is provided at the bottom portion of the water supply pipe 34.

Moreover, a diaphragm type of the water supply valve (not shown) is installed on the top portion of the water supply pipe 34; using the water supply valve, the supply of flush water from the water supply pipe 34 into the reservoir tank 18 is switched between supply and shut off.

The small tank 36 is an essentially rectangular vessel, removably installed on the side of the water supply pipe 34. A reverse shutoff valve (not shown) is installed on the small tank 36 for opening and closing an opening (not shown) on the bottom surface thereof. The water supply float 38 is disposed inside the small tank 36, and moves up and down with the water level inside the small tank 36.

The water supply float 38 is connected to a water supply valve (not shown) through an oscillating body 40 to open and close the water supply valve by up and down movement. Specifically, flush water stored in the small tank 36 is discharged from an opening (not shown) formed on the bottom surface thereof, therefore water supply float 38 drops in tandem with the drop in the water level inside the small tank 36. The water supply valve is opened by the drop in the water supply float 38 and flush water is supplied into the reservoir tank 18 from the water supply opening 34a.

Next, referring to FIG. 2, the discharge valve apparatus 24 will be explained. The discharge valve apparatus 24 is positioned above the discharge opening 32, and is a discharge valve apparatus of the direct acting type, whereby the valve body 42 moves up and down in the vertical direction to open and close the discharge opening 32.

The discharge valve apparatus 24 comprises a pedestal 44 and an overflow pipe 46. The pedestal 44 is disposed essentially directly over discharge opening 32. The pedestal 42 comprises multiple columnar portions 44a arrayed concentrically about the center of the discharge opening 32; the concentric connecting portion 44b is screw mounted into discharge opening 32. Also, a discharge space 44c communicating with the discharge opening 32 is formed on the lower portion of pedestal 44. After flush water passes from the opening 44d between the columnar portions 44a and passes through the discharge space 44c, it is discharged from the discharge opening 32.

The overflow pipe 46 is disposed as a single piece with the pedestal 44 on the side of the pedestal 44. The overflow pipe 46 is formed as a cylinder, with an upward facing top end opening. The bottom end opening of the overflow pipe 46 opens horizontally, approximately perpendicular to the top end opening, and communicates with the discharge space 44c. The overflow pipe 46 is provided in order to prevent overflow of flush water from the reservoir tank 18; if the water level inside the reservoir tank 18 exceeds the top end opening of the overflow pipe 46, flush water flows into the overflow pipe 46 and is discharged to the discharge opening 32.

The discharge valve apparatus 24 comprises the valve body 42, the float 48, and the variable drop start timing mechanism 50. The valve body 42 is cylindrically formed, and has a rubber seal portion 42a on the bottom surface facing the discharge opening 32. Also, the valve body 42 is disposed to move up and down within a predetermined range inside the pedestal 44, closing the discharge opening 32 at the bottom-most position of the movable range.

The float 48 is disposed as a single piece with the valve body 42, and a bottom portion 48a thereof is disposed thereon so as to project below the seal portion 42a on the valve body 42. When the water level inside the reservoir tank 18 falls and the float 48 reaches a predetermined height, it then drops in tandem with subsequent drops in the water level.

The variable drop start timing mechanism 50 is a buoyancy adjustment mechanism for the float 48, and is disposed on top of the float 48. The purpose of the variable drop start timing mechanism 50 is to change (make variable) the water level inside the reservoir tank 11 when the valve body 42 and the float 48 start to drop in tandem with the fall in the water level inside the reservoir tank 18.

By disposing the variable drop start timing mechanism 50 on top of the float 48, the water level at which the valve body 42 and the float 48 start to drop can be changed at the same time that the height of the float 48 above the discharge opening 32 is kept fixed.

Next, referring to FIG. 3, the concrete structure of the variable drop start timing mechanism 50 is explained. FIG. 3 is a perspective view showing a variable drop start timing mechanism in a discharge valve apparatus according to a first embodiment of the present invention. In FIG. 3, the left side of the diagram shows the variable drop start timing mechanism 50 when the dead water level (DWL) is set to a low position, and the right side of the diagram shows the variable drop start timing mechanism 50 when the dead water level (DWL) is set to a high position. Here, dead water level (DWL) refers to the flush water level inside the flush water tank when discharge of flush water is stopped. Note that, as shown in FIG. 2, the low position dead water level is called the "low DWL," and the high position dead water level is called the "high DWL."

As shown in FIG. 3, the valve body 42 and the float 48 are installed as a single unit. The valve body 42 is placed in a flange shape at the outside perimeter lower portion of the float 48, which is formed in a hollow cylindrical shape. A screw 52 is installed on the outside perimeter surface of the float 48, continuous in the circumferential direction, above the valve body 42.

In addition, an outwardly projecting projection 54 is disposed on the top portion of the outside perimeter surface of the float 48. Moreover, an attaching portion 56, to which a bead chain 30 is attached (see FIG. 2), is provided on the top end surface of the float 48.

The variable drop start timing mechanism 50 comprises a reservoir portion 58 and an adjustment portion 60. The reservoir portion 58 is formed by a cylindrical side wall 58a erected on the outside perimeter side thereof; the side wall 58a forms a water storage area projecting upward at the top of the float 48 by being externally inserted into the float 48.

A screw 62, continuous in the circumferential direction, is disposed on the inside perimeter surface of the side wall 58a. Specifically, the screw 62 is disposed in the circumferential direction on a part of the inside perimeter surface of the side wall 58a. Note that FIG. 3 shows an example in which the screw 62 is placed on the opposing inside perimeter surface part of the side wall 58a.

The threaded engagement of the screw 52 of the float 48 and the screw 62 of the side wall 58a forms the adjustment portion 60 for advancing and retracting the side wall 58a at the top of the float 48. Changing of the reservoir area in the height direction is enabled by the adjustment portion 60.

In the adjustment portion 60, the diameter of the side wall 58a is widened by the riding up of the screw 62 on the projection 54 of the float 48 when the screw 52 of float 48 and the screw 62 of the side wall 58a are threaded together. The rotation of side wall 58a side wall 58a is thus restricted, and side wall 58a is affixed at the height of that projection.

In this way, the adjustment portion 60 comprises a reservoir portion 58 for storing flush water, therefore flush water stored in the reservoir portion 58 functions as a weight relative to the float 48. Also, the variable drop start timing mechanism 50 comprises the adjustment portion 60 for adjusting the amount of water stored in the reservoir portion 58, therefore the weight of the weight can be adjusted, as can the buoyancy of the float 48. In addition, the adjustment portion 60 permits the engagement of the screw 52 and the screw 62, and therefore has a simple structure.

Note that, in the present embodiment, the variable drop start timing mechanism 50 adjustment portion 60 changes the height of side wall 58a using float 48 screw 52 and side wall 58a screw 62, but other structures may also be adopted, without limit to such a structure.

Figure 4:
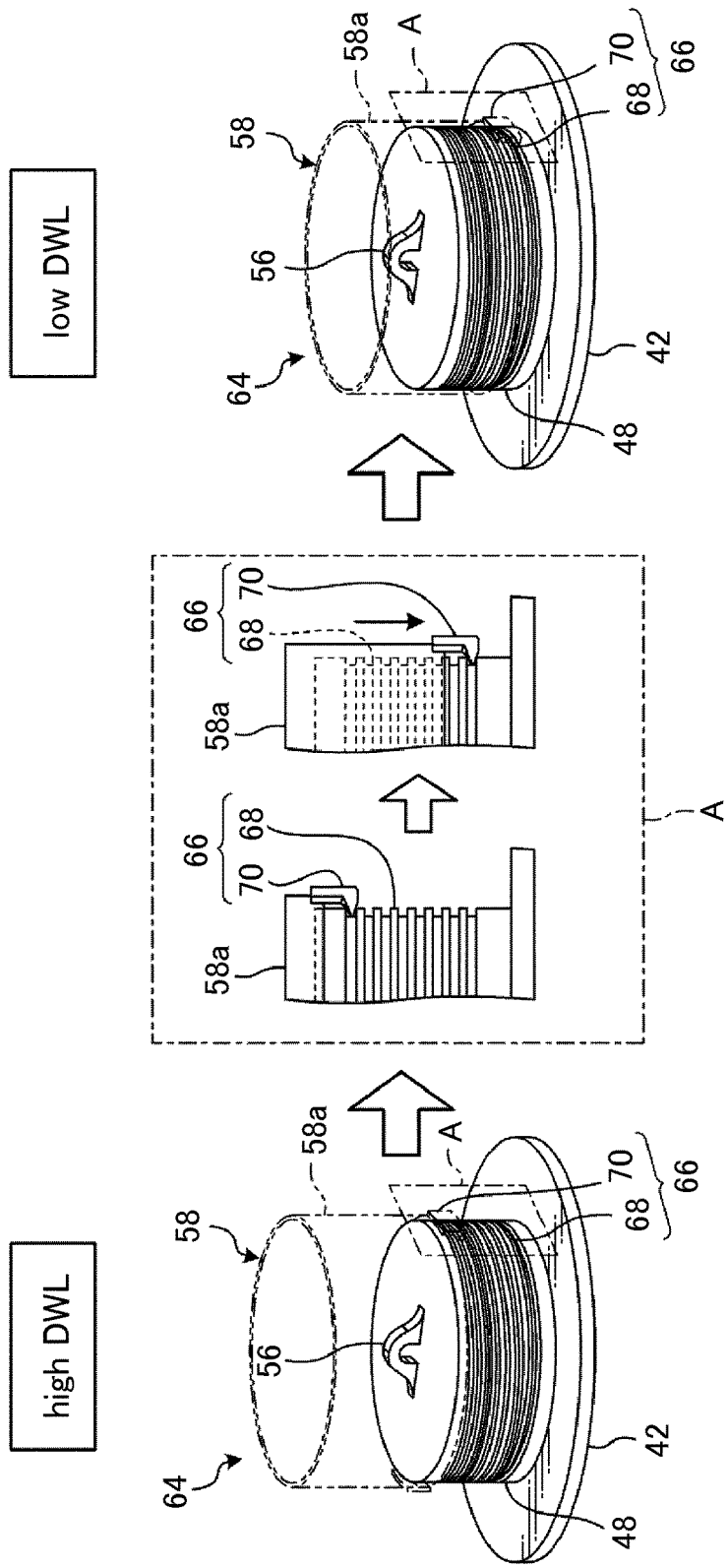
FIG. 4 is a perspective view showing another example of a variable drop start timing mechanism in a discharge valve apparatus according to the first embodiment of the present invention.

Here, referring to FIG. 4, another example of a variable drop start timing mechanism is explained. FIG. 4 is a perspective view showing another example of a variable drop start timing mechanism in a discharge valve apparatus according to a first embodiment of the present invention. Note that in the explanation of another variable drop start timing mechanism shown in FIG. 4, those parts which are identical or equivalent to the same parts in the variable drop start timing mechanism 50 in FIG. 3 are assigned the same reference numerals, and an explanation thereof is omitted.

As shown in FIG. 4, the variable drop start timing mechanism 64, which is another example, is continuously disposed on the outside perimeter surface of the float 48 as the adjustment portion 66, and comprises the strip portions 68, multiply arrayed in the axial direction of the float 48, and the claw portions 70, disposed in two locations opposite the bottom end edge of the side wall 58a.

As shown by the expanded view in part A of FIG. 4, the side wall 58a is affixed by the projection height thereof by insertion of the claw portions 70 between the strip portions 68. The pushing down of the side wall 58a results in the movement of the claw portions 70 downward as they pass over the strip portions 68. When moving the side wall 58a upward, the side wall 58a can be pulled up to adjust the projection height of the side wall 58a.

Next, returning to FIG. 2, the guide portion 72 of the discharge valve apparatus 24 is explained. As shown in FIG. 2, the guide portion 72 is installed on top of the pedestal 44.

Also, the guide portion 72 is formed in a cylindrical shape into which the side wall 58a can be inserted. The guide portion 72 guides the up and down movement of the side wall 58a of the reservoir portion 58, thereby stabilizing the up and down movement of the valve body 42.

The multiple openings 74 are aligned along the circumference of the perimeter surface of the guide portion 72. The openings 74 are formed in an essentially rectangular shape. The top end edges of each opening 74 are positioned above the top end edge of the side wall 58a (see FIG. 3, etc.) in a state whereby the side wall 58a of the reservoir portion 58, guided by the guide portion 72, reaches the highest position in its movable range.

Thus guide portion 72 has openings 74, hence excess flush water exceeding the set storage water amount can be made to flow out from the openings 74. The amount of stored water in the reservoir portion 58 is thus stabilized. I.e., the float 48 can constantly achieve exactly the set buoyancy, without being affected by the guide portion 72. This enables the buoyancy of the float 48 to be maintained at essentially a constant level.

In the state, whereby the valve body 42 is at the highest position within its range of motion, the top end edges of the openings 74 are positioned above the top end edge of the side wall 58a, therefore excess flush water in the guide portion 72 exceeding the stored water amount in the reservoir portion 58 can be reliably made to flow out. This enables the buoyancy set on the float 48 to be achieved at all times. As a result, the float 48 buoyancy can be maintained at essentially a constant level.

The surface area is formed to a size such that the flush water level inside the guide portion 72 falls at essentially the same speed as the flush water level inside the reservoir tank 18. I.e., the openings 74 are of a size such that flush water accumulated inside the guide portion 72 can sufficiently flow out to the outside. Flush water accumulated in the guide portion 72 can by this means drop at essentially the same time as the water level inside the reservoir tank 18 drops. As a result, exactly the set buoyancy can be made to act on the float 48, and the buoyancy of the float 48 can be kept essentially fixed.

Figure 5:
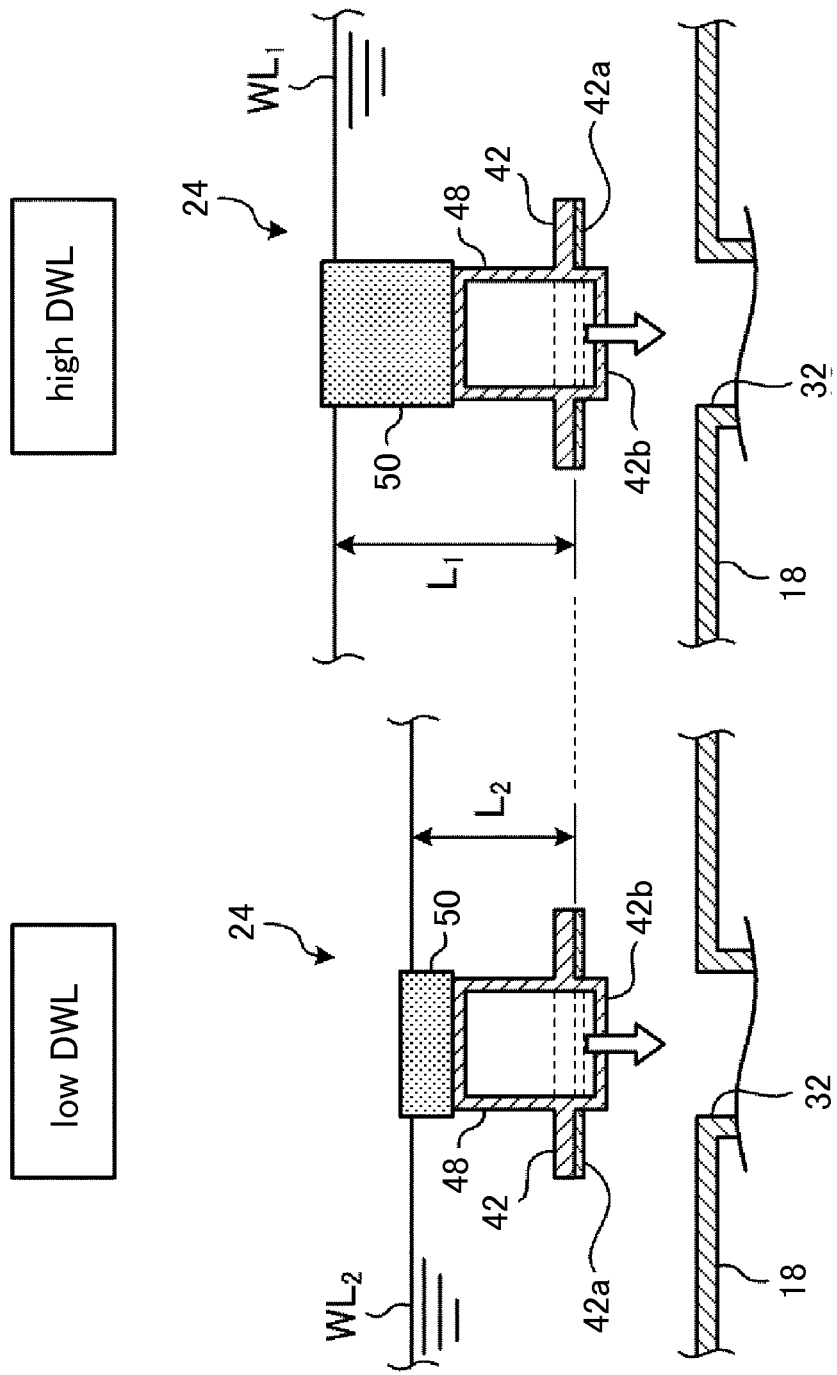
FIG. 5 is a view showing the basic operation of a discharge valve apparatus according to the first embodiment of the present invention.

Next, referring to FIG. 5, the basic operation of a discharge valve apparatus according to the present embodiment is explained. FIG. 5 is a view showing the basic operation of a discharge valve apparatus according to a first embodiment of the present invention. In FIG. 5, the left side of the figure shows a discharge valve apparatus 24 in which the dead water level is set to a low position (the low DWL setting), and the right side of the figure shows a discharge valve apparatus 24 in which the dead water level is set to a high position (the high DWL setting).

If the amount of flush water supplied from the reservoir tank 18 is set to be large, then in the discharge valve apparatus 24 the difference is increased between the flush water level when the supply of water to the reservoir tank 18 is completed (the shut off water level) and the above-described dead water level. I.e., the water level is set to the low DWL in FIG. 5 (referred to as the "low DWL setting"). Conversely, if one wishes to set the flush water amount supplied from the reservoir tank 18 to be low, the difference between the shut off water level and the dead water level is small. I.e., the water level is set to the high DWL in FIG. 5 (referred to as the "high DWL setting").

When the water level inside the reservoir tank 18 descends to predetermined water level heights WL1 and WL2, the float 48 drops in tandem with the subsequent water level drop, as shown by the white arrow in the figure.

The variable drop start timing mechanism 50 enables the timing at which the valve body 42 and the float 48 start to drop in tandem with the drop in the water level inside the reservoir tank 18. Specifically, the height position of valve body 42 relative to water levels WL1, WL2 can be changed when the valve body 42 and the float 48 start to drop. Note that the height position of the valve body 42 relative to water levels WL1 and WL2 refers to the relative heights of water levels WL1, WL2 and the valve body 33, and refers specifically to the distances L1, L2 from the flush water surface to the valve body 42.

Here, as shown in FIG. 5, in both the low DWL setting case and the high DWL setting case, elapsed time from the start of the drop of the valve body 42 until the discharge opening 32 closes is essentially the same. On the other hand, the timing at which the valve body 42 starts to drop differs between the low DWL setting case and the high DWL setting case.

Therefore by using the discharge valve apparatus 24 of the present embodiment, the timing of the start of the valve body 42 drop can be made variable, thereby enabling the discharge opening 32 open time to be varied. This enables the amount of flush water to the toilet to be varied, so that the amount of flush water can be adjusted according to type of toilet.

Next, referring to FIGS. 6 through 10, we explain the operation of the discharge valve apparatus 24. FIGS. 6 through 10 are all views showing the operation of a discharge valve apparatus according to a first embodiment of the present invention. In FIGS. 6 through 10, a discharge valve apparatus 24 at a low DWL setting is shown on the left side of the diagram, and a discharge valve apparatus 24 at a high DWL setting is shown on the right side of the diagram.

In the discharge valve apparatus 24, a greater volume of flush water is discharged from the discharge opening 15 with a low DWL setting than with a high DWL setting. Conversely, a lesser volume of flush water is discharged from the discharge opening 15 with a high DWL setting than with a low DWL setting.

Figure 6:
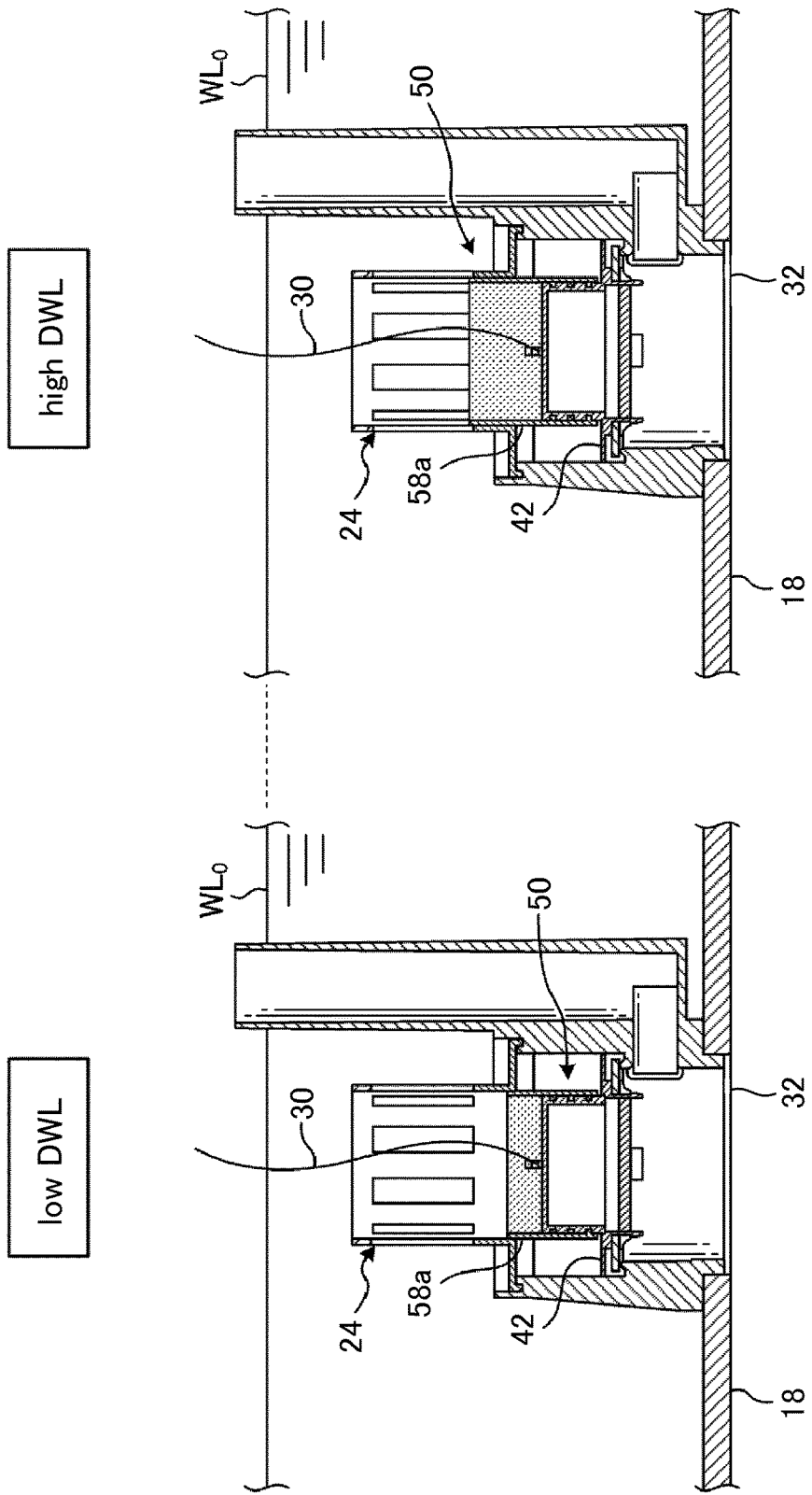
FIG. 6 is a view showing the operation of a discharge valve apparatus according to the first embodiment of the present invention.

FIG. 6 shows the state prior to the start of discharge of flush water. In the discharge valve apparatus 24, the discharge opening 32 is closed off by valve body 42 at the low DWL setting and at the high DWL setting. At this point, the water level inside the reservoir tank 18 is in both cases the shut off water level WL0.

Thereafter the spindle 28 turns when the lever handle 26 is operated (see FIG. 2). When the spindle 28 turns, the valve body 42 is pulled upward by the bead chain 30 and moves to the highest position within its range of motion. Flush water is thus discharged from the discharge opening 32.

As shown in FIG. 7, with a discharge valve apparatus 24 at a high DWL setting, when flush water is discharged and the water level inside the reservoir tank 18 reaches a predetermined height WL1, the balance between buoyancy and the weight of the float 48 itself is upset, and the valve body 42 and the float 48 start to drop in tandem with the subsequent drop in water level. On the other hand, with a discharge valve apparatus 24 at a low DWL setting, buoyancy is sufficiently active relative to the weight of the float 48, therefore the valve body 42 stays at the topmost position. Note that in FIG. 7 the falling water level is shown by the diagonally shaded arrow, and discharged flush water is shown by the arrowed lines.

Figure 8:
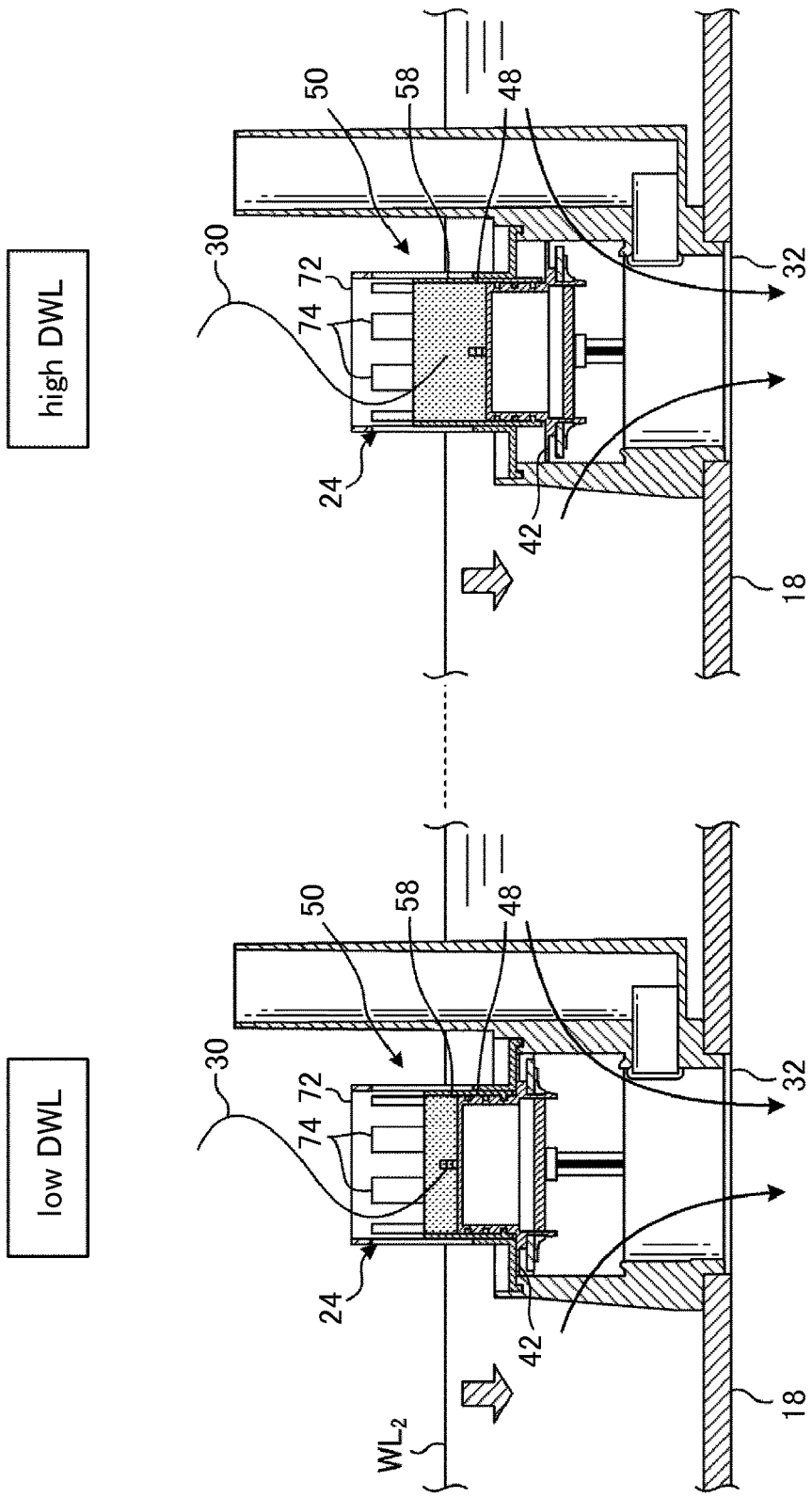
FIG. 8 is a view showing the operation of a discharge valve apparatus according to the first embodiment of the present invention.

Next, as shown in FIG. 8, in a discharge valve apparatus 24 at a high DWL setting, the valve body 42 continues to drop in tandem with the falling water level. If the discharge valve apparatus 24 is at a low DWL setting, on the other hand, then when the water level inside the reservoir tank 18 reaches a predetermined height WL2, the balance between buoyancy and the weight of the float 48 itself is upset, and the valve body 42 and the float 48 start to drop in tandem with the subsequent drop in water level. I.e., in a discharge valve apparatus 24 at a low DWL setting, the valve body 42 starts to drop later than with a discharge valve apparatus 24 at a high DWL setting. Note that in FIG. 8, as well, the falling water level is shown by the diagonally striped arrow, and discharged flush water is shown by arrowed lines.

Also, as shown in FIG. 8, because flush water flows out from the openings 74 on the guide portion 72 even if the valve body 42 continues to drop, flush water does not accumulate inside the guide portion 72, and no weight exceeding the flush water stored in the reservoir portion 58 is imposed on the float 48.

Figure 9:
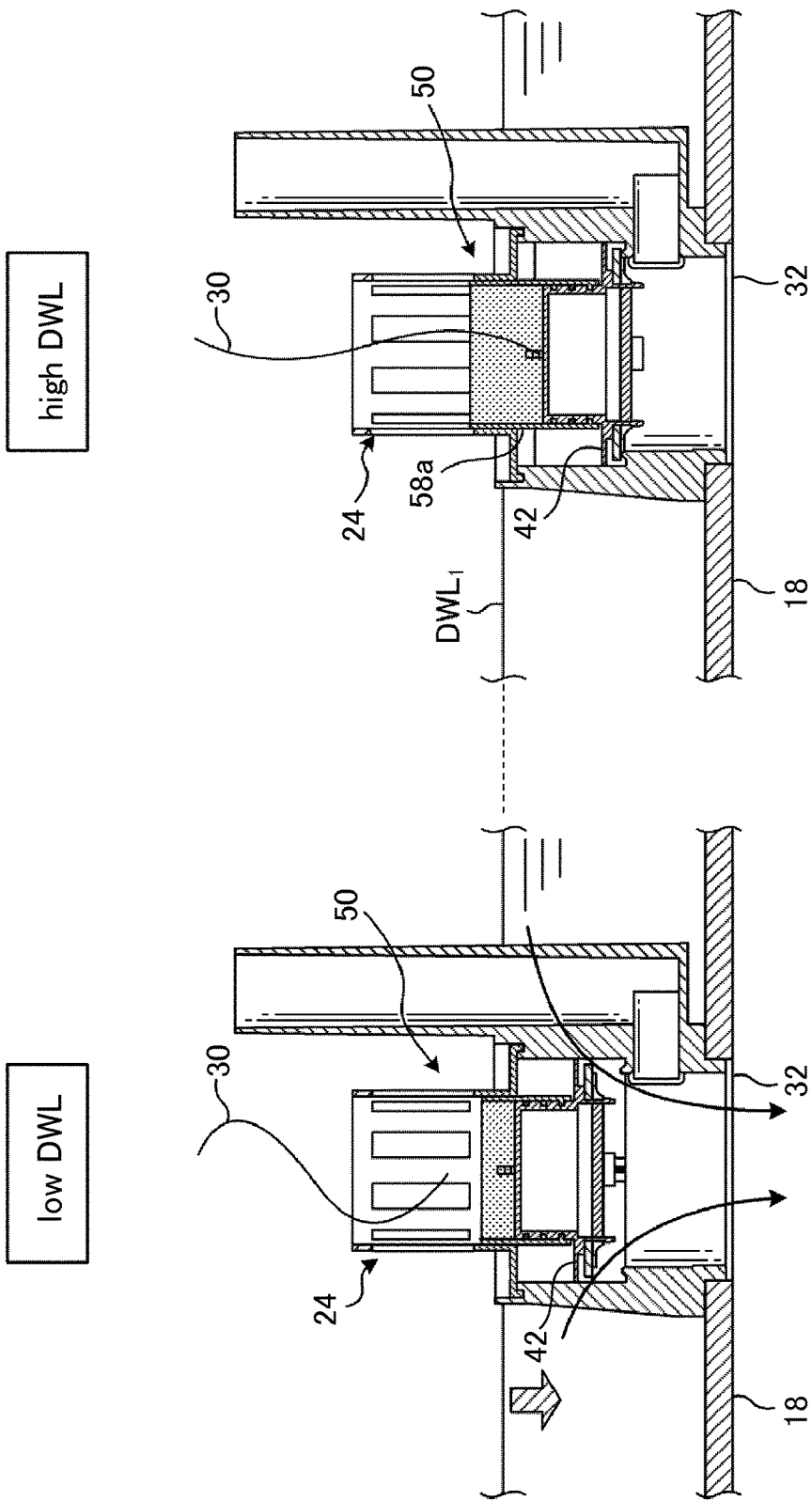
FIG. 9 is a view showing the operation of a discharge valve apparatus according to the first embodiment of the present invention.

Next, as shown in FIG. 9, the valve body 42 reaches the bottom-most position of the range of motion in a discharge valve apparatus 24 at a high DWL setting, and the discharge opening 32 is closed. Note that when the valve body 42 moves in tandem with the falling water level and approaches the bottom-most position, it is pulled toward the flow of the flush water being discharged from the discharge opening 32, and rapidly drops to the bottom-most position. Here, in a discharge valve apparatus 24 at a high DWL setting, the water level when the discharge opening 32 is closed by the valve body 42 is the dead water level DWL1.

On the other hand, in a discharge valve apparatus 24 at a low DWL setting, the valve body 42 continues to drop in tandem with the falling water level. Note that in FIG. 9, as well, the falling water level is shown by the diagonally shaded arrow, and discharged flush water is shown by arrowed lines.

Figure 10:
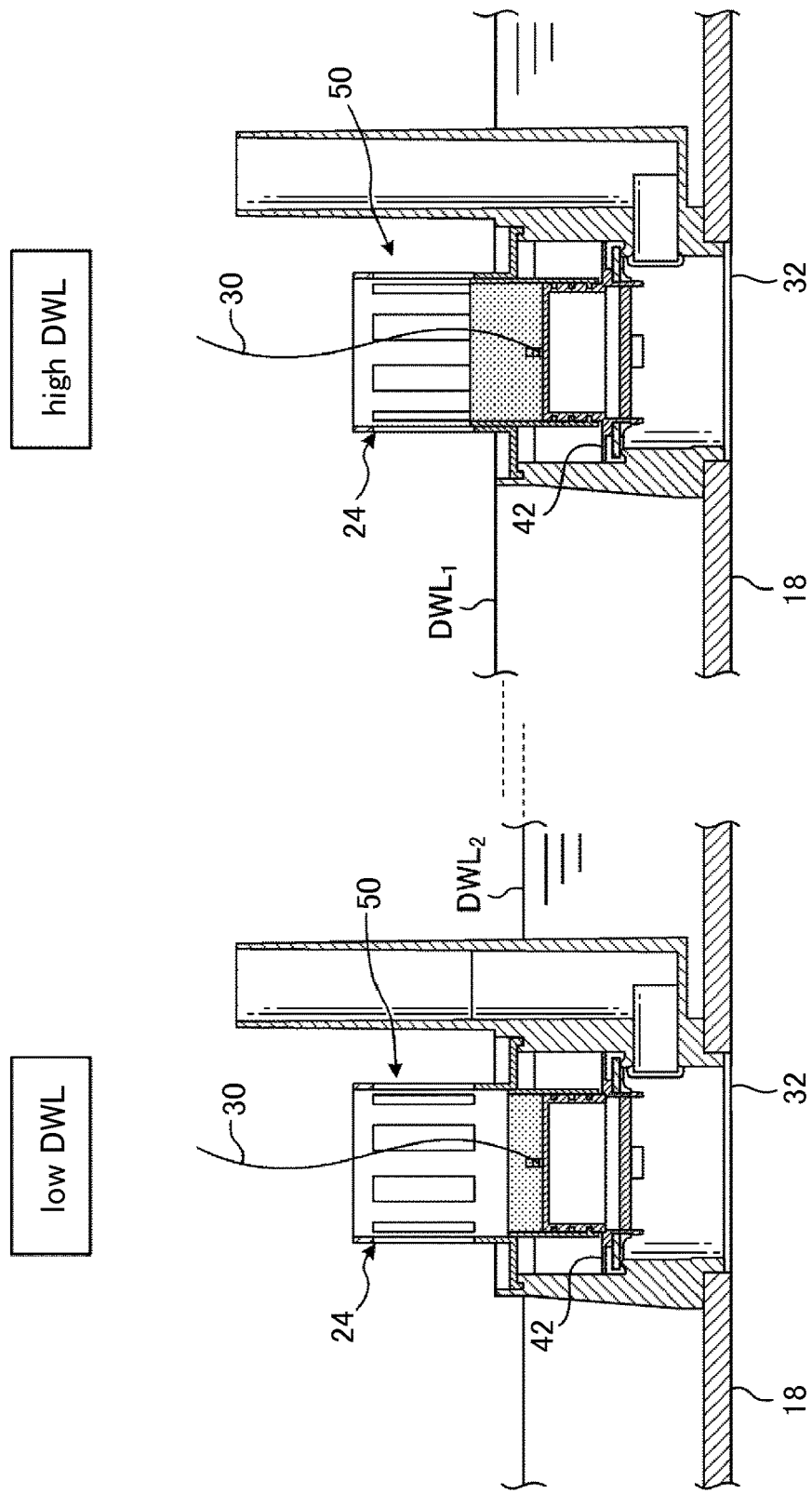
FIG. 10 is a view showing the operation of a discharge valve apparatus according to the first embodiment of the present invention.

Next, as shown in FIG. 10, even in a discharge valve apparatus 24 at a low DLW setting, which is slower than a high DWL setting, the valve body 42 reaches the bottom-most position of the range of motion, and the discharge opening 32 is blocked. Note that the valve body 42 rapidly drops as it approaches the bottom-most position, and the point at which it reaches the bottom-most position is the same as with a discharge valve apparatus 24 at a high DWL setting. Here, in a discharge valve apparatus 24 at a low DWL setting the water level when the discharge opening 32 is closed by the valve body 42 is dead water level DWL2, which is lower than the dead water level DWL1 with a discharge valve apparatus 24 at a high DWL setting. Note that the shut off water level WL0 (see FIG. 6) is the same in either of the discharge valve apparatus 24 settings, therefore more flush water is discharged from the discharge opening 32 in a discharge valve apparatus 24 at a low DWL setting than in a discharge valve apparatus 24 at a high DWL setting.

As described above, when using a discharge valve apparatus 24 according to the present embodiment, the height position of the valve body 42 relative to the water level when the valve body 42 starts to drop can be changed, thus enabling the timing at which the valve body 42 starts to drop to be made variable. By making the timing at which the valve body 42 starts to drop variable, the time during which the discharge opening 32 is open can be varied, and the amount of water discharged from the discharge opening 32, i.e., the amount of flush water to the toilet, can be varied. Thus the amount of flush water can be varied according to the type of toilet.

Also, a reservoir tank apparatus 4 according to the present embodiment comprises a discharge valve apparatus 24, therefore the amount of flush water can be adjusted according to the type of toilet. In addition, the flush toilet 1 of the present embodiment comprises a reservoir tank apparatus 4, therefore the amount of flush water can be adjusted according to the type of toilet.

In the discharge valve apparatus 24 according to the present embodiment described above, flush water stored in reservoir portion 58 was used as a weight in order to adjust the buoyancy of the float 48 but, without such limitation, interchangeable weight members according to required weight and height could, for example, also be used.

Also, in the discharge valve apparatus 24 according to the above-described embodiment the buoyancy of the float 48 was adjusted using the projection height of the bottom portion 48*a*, but it would also be acceptable to provide an interchangeable container for each desired buoyancy and height, attach such a container at the top of the float 48.

Next, referring to FIGS. 11 through 22, a discharge valve apparatus according to a second embodiment of the present invention is explained.

In the discharge valve apparatus 80 according to a second embodiment, the variable drop start timing mechanism thereof differs in structure from that of the first embodiment of the present invention, therefore the differing structures therein will be explained primarily.

Figure 11:
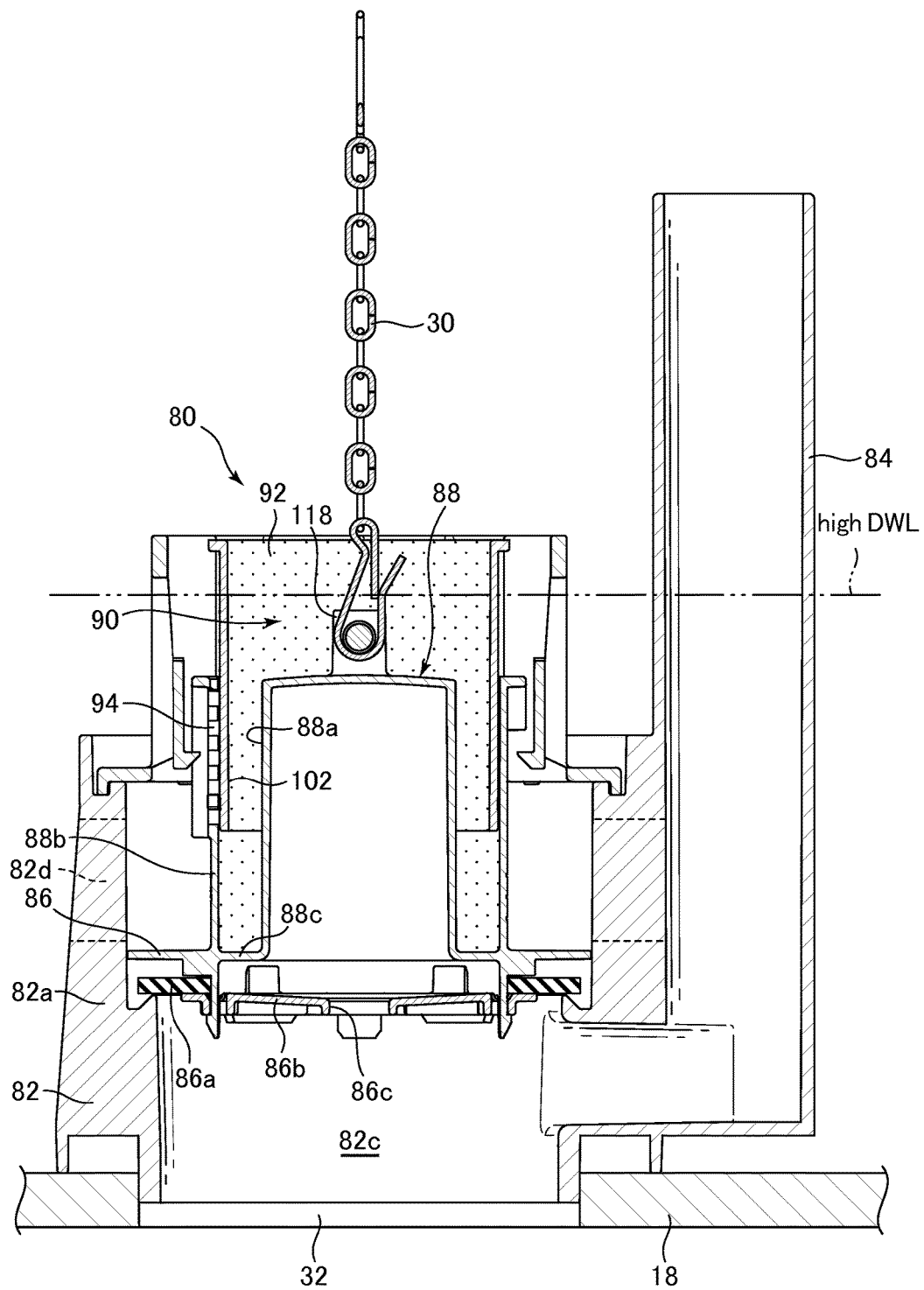
FIG. 11 is a cross section view showing a discharge valve apparatus according to a second embodiment of the present invention.
Figure 12:
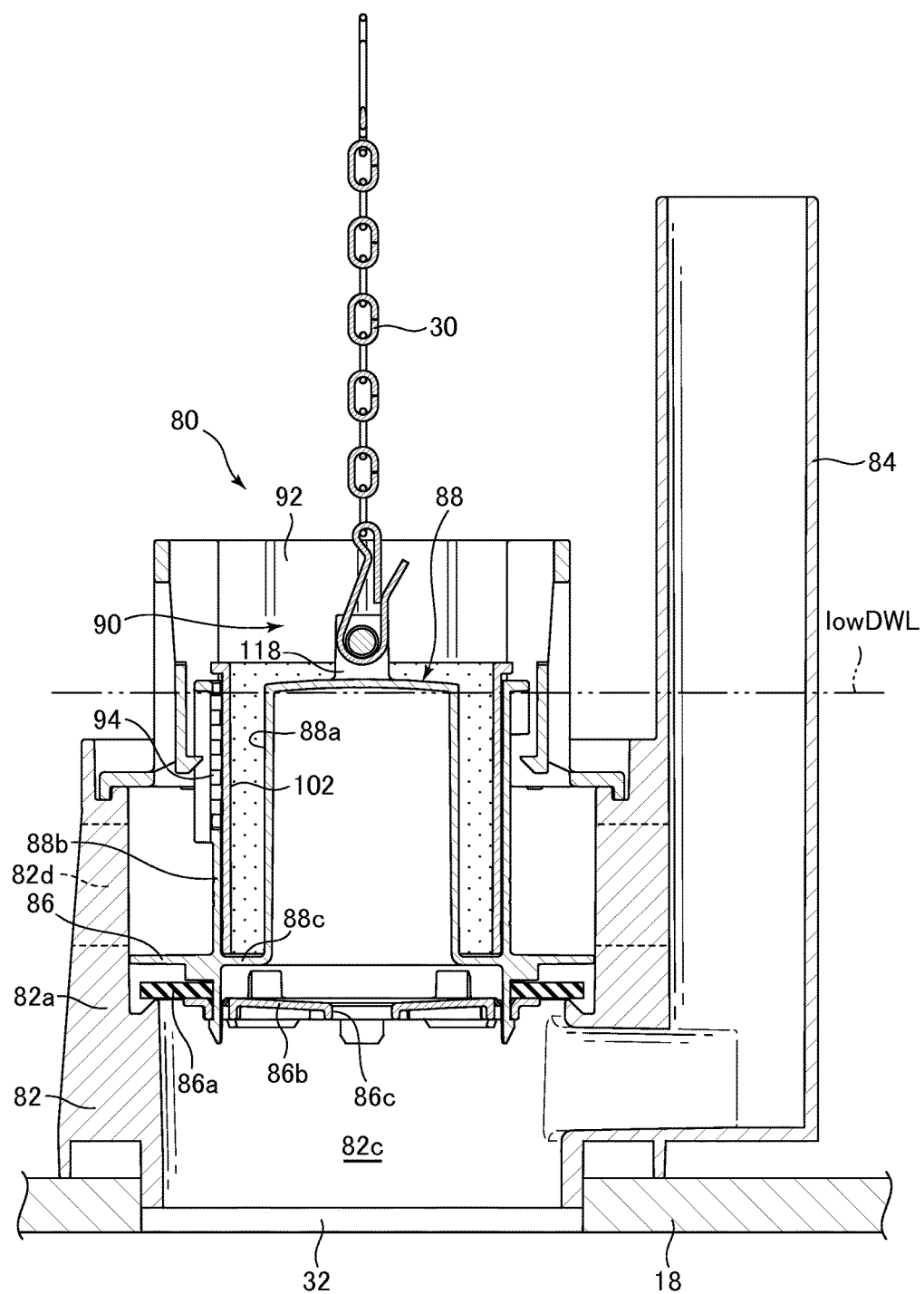
FIG. 12 is a cross section view showing a discharge valve apparatus according to the second embodiment of the present invention.

FIG. 11 shows the cross section view showing a discharge valve apparatus 80 according to a second embodiment of the present invention, wherein the dead water level is set to a high position (a high DWL setting); FIG. 12 shows a cross section view showing a discharge valve apparatus 80 according to a second embodiment of the present invention, wherein the dead water level is set to a low position (a low DWL setting).

Figure 13:
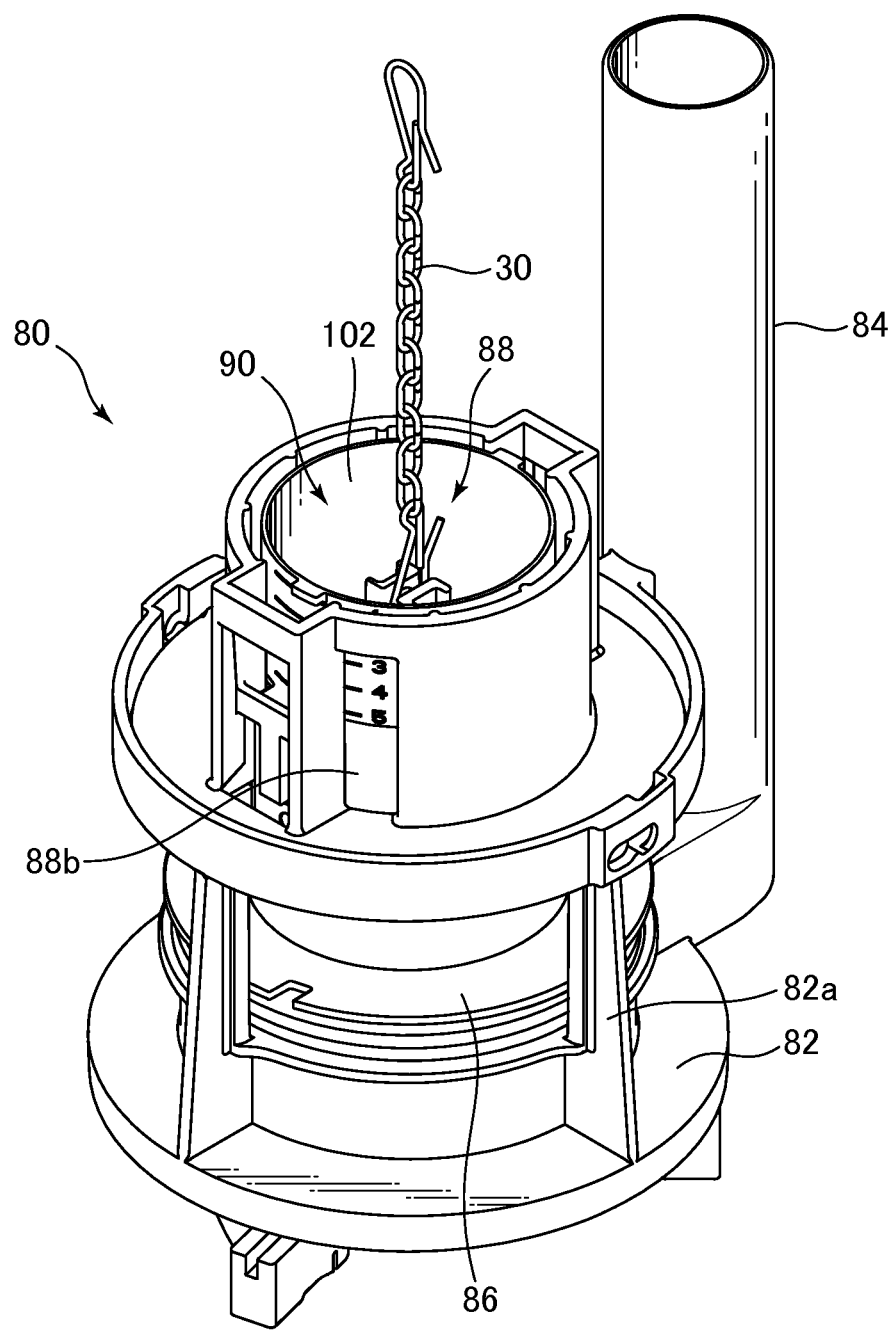
FIG. 13 is a perspective view of the discharge valve apparatus shown in FIG. 11.
Figure 14:
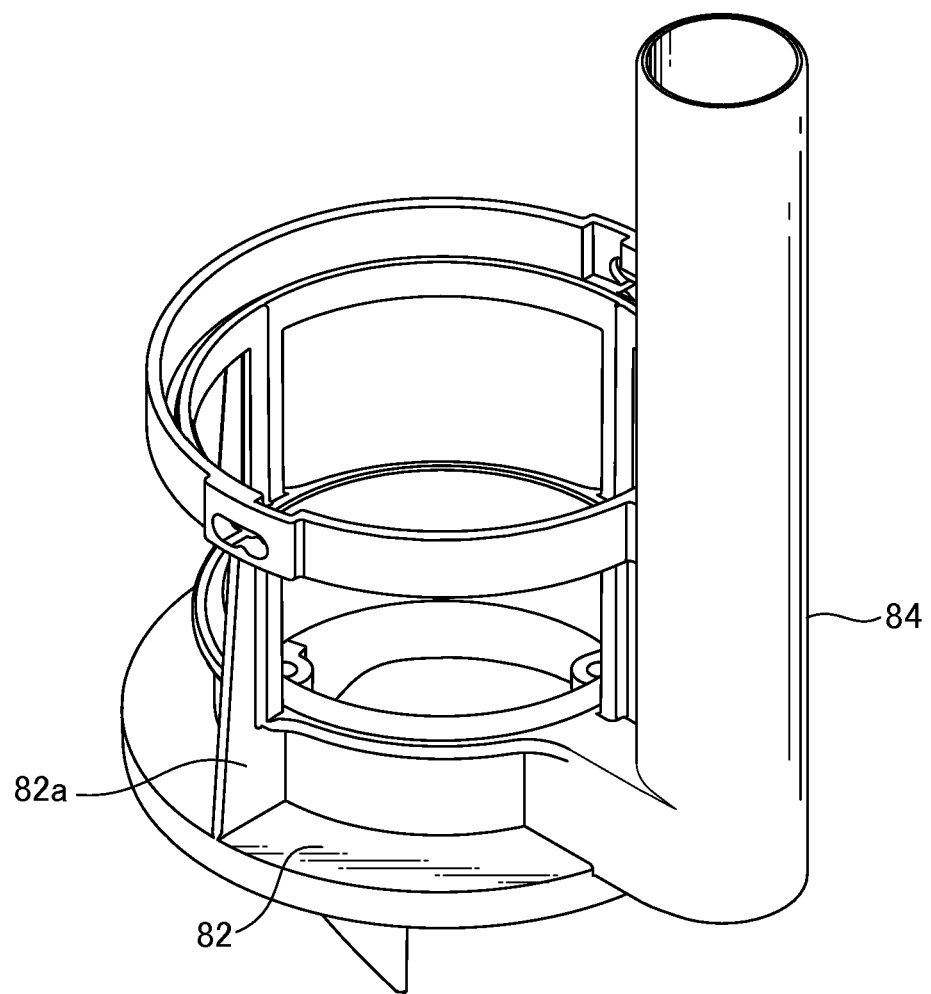
FIG. 14 is a perspective view showing a pedestal and overflow pipe in a discharge valve apparatus according to the second embodiment of the present invention.
Figure 15:
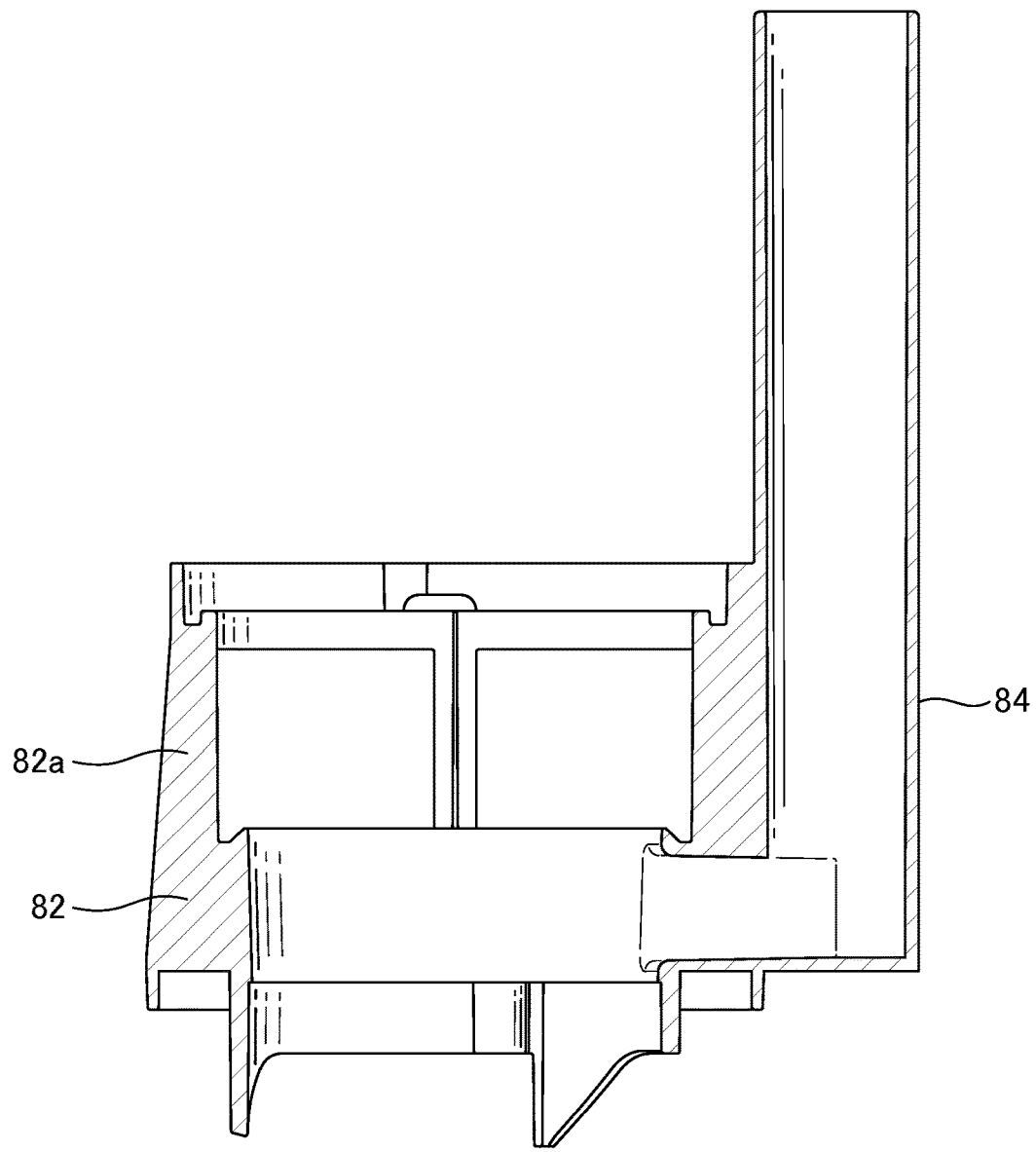
FIG. 15 is a cross section view showing a pedestal and overflow pipe in a discharge valve apparatus according to the second embodiment of the present invention.

As shown in FIGS. 11 through 13, discharge valve apparatus 80 comprises a pedestal 82 and an overflow pipe 84. As shown in FIGS. 11 through 15, the pedestal 82 is disposed essentially immediately above the discharge opening 32. The pedestal 82 comprises multiple post portions 82*a* arrayed concentrically around the center of the discharge opening 32, the bottom-most portion of which engages the discharge opening 32. Also, a discharge space 82*c* communicating with the discharge opening 32 is formed on the bottom portion of the pedestal 82. After flush water passes from the opening 82*d* between the columnar portions 82*a* and passes through the discharge space 82*c*, it is discharged from the discharge opening 32.

Also, as shown in FIGS. 11, 12, 16, and 17, the discharge valve apparatus 80 comprises the valve body 86, the float 88, and the variable drop start timing mechanism 90. The valve body 86 is formed in a cylindrical shape, and has a rubber seal portion 86*a* at the bottom surface facing the discharge opening 32. This rubber seal portion 86*a* is attached at the bottom of the valve body 86 by a seal portion support member 86*b* (see FIG. 19). This seal portion support member 86*b* is the bottom surface of the valve body 86, and a hole 86*c* for the discharging flush water in the float 88 is formed at the center portion thereof The float 88 comprises a cylindrical inside cylinder 88*a* closed at the top end, and a cylindrical outside cylinder 88*b* open at the top end; the bottom ends of the inside cylinder 88*a* and the outside cylinder 88*b* are closed off by the bottom surface 88*c*; furthermore, the bottom ends of the inside cylinder 88*a* and the outside cylinder 88*b* are continuous with the valve body 86, and are integrally formed as a single piece with the valve body 86. When the water level inside the reservoir tank 18 falls and the float 88 reaches a predetermined height, it then drops in tandem with subsequent drops in the water level.

As shown in FIGS. 11 and 12, the variable drop start timing mechanism 90 is a buoyancy adjustment mechanism for the float 88, and as described below is placed in an area around and above the float 88. The purpose of the variable drop start timing mechanism 90 is to change (make variable) the water level inside the reservoir tank 11 when the valve body 86 and the float 88 start to drop in tandem with the drop in the water level inside the reservoir tank 18.

Figure 16:
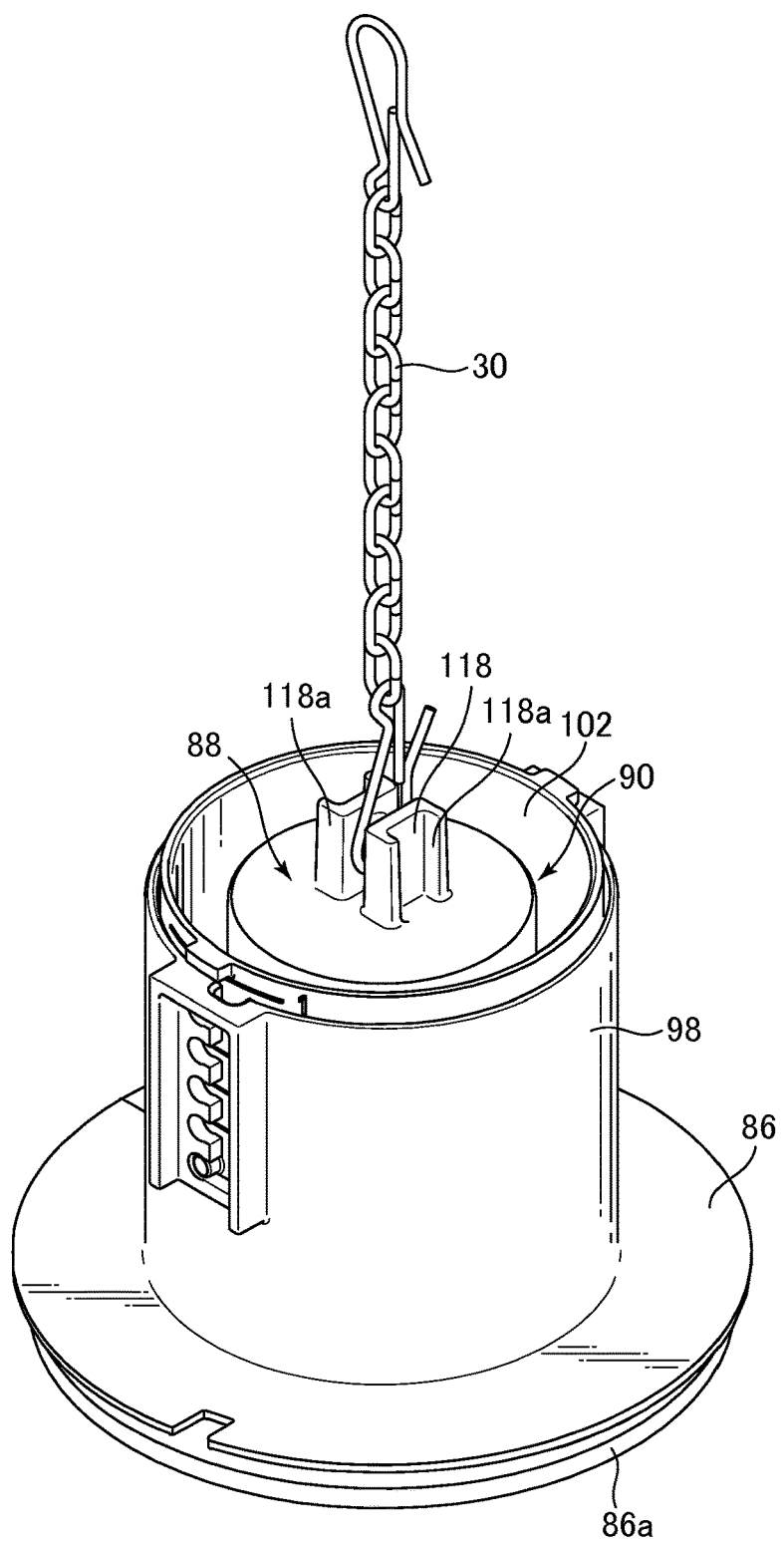
FIG. 16 is a perspective view showing a valve body, float, and drop start timing adjustment mechanism in a discharge valve apparatus according to the second embodiment of the present invention.
Figure 17:
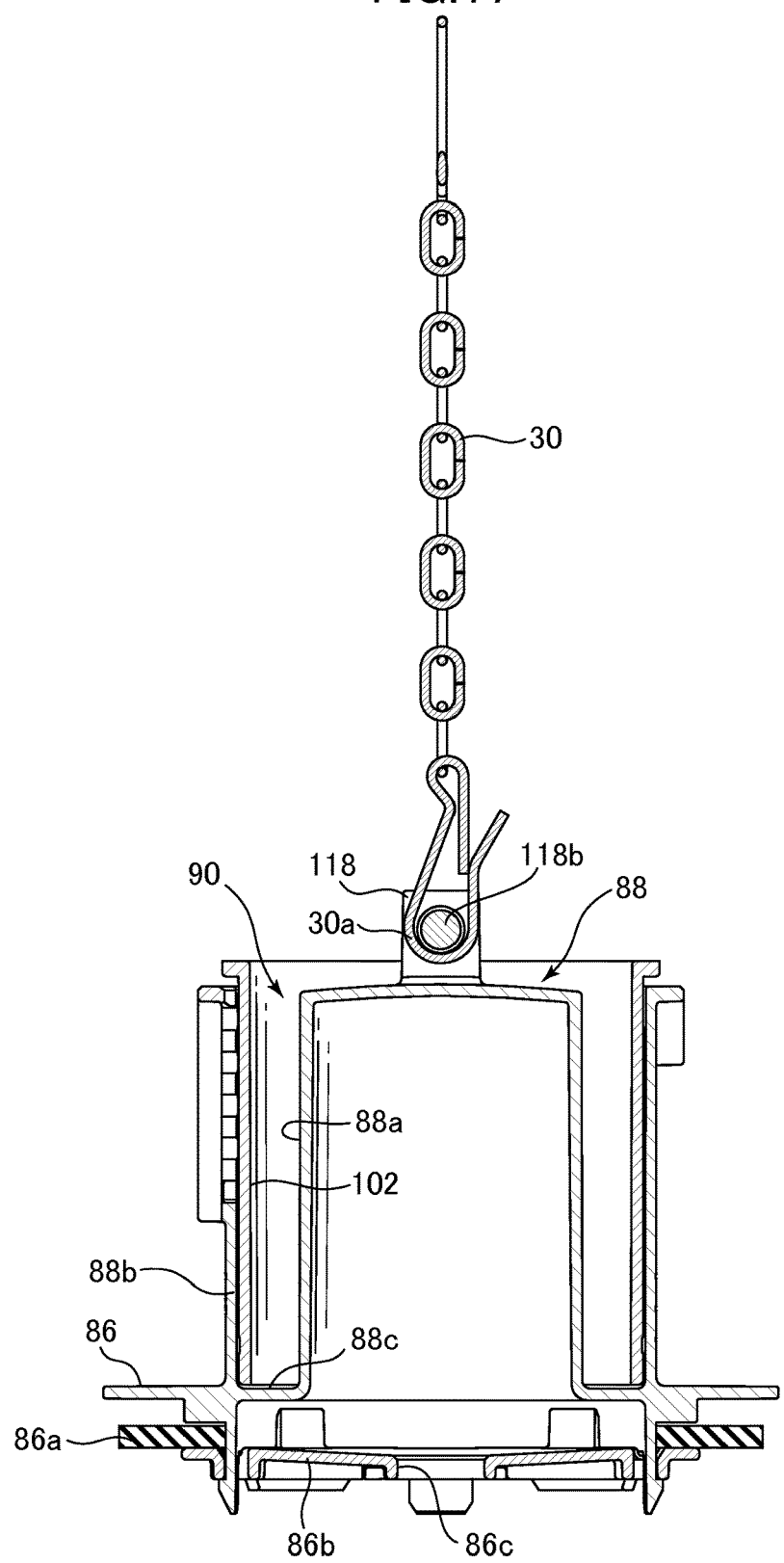
FIG. 17 is a cross section view showing a valve body, float, and drop start timing adjustment mechanism in a discharge valve apparatus according to the second embodiment of the present invention.

Next, referring to FIGS. 16 and 17, the specific structure of the variable drop start timing mechanism 50 is explained. FIGS. 16 and 17 are a perspective view and a cross section view showing a valve body, float, and variable drop start timing mechanism in a discharge valve apparatus according to a second embodiment of the present invention. FIGS. 16 and 17 show a variable drop start timing mechanism 90 of the same type as shown in FIG. 12, with the dead water level (DWL) set to the low position (the low DWL setting).

The variable drop timing mechanism 90 comprises a reservoir portion 92 and an adjustment portion 94. The reservoir portion 92 is formed in an area around and above the float 88. Specifically, the reservoir portion 92 comprises a donut-shaped container open at the top, formed by the float 88 inside the cylinder 88*a*, the outside cylinder 88*b*, and the bottom surface 88*c*. Moreover, the reservoir portion 92 comprises a cylindrical side wall 102 open at the top and bottom ends, inserted from above into the inside of the outside cylinder 88*b* and affixed to the inside of the outside cylinder 88*b*. This side wall 102 is formed over the entire perimeter, and can store flush water up to the top end portion of the side wall 102. In this way, the reservoir portion 92 is formed by inside the cylinder 88*a*, the outside cylinder 88*b*, the bottom surface 88*c*, and the side wall 102 of the float 88, and the internal space (the area around and above the float 88) formed thereby forms a reservoir area for storing flush water.

Next, referring to FIG. 17 and FIGS. 20 through 22, the adjustment portion 94 of the variable drop start timing mechanism 90 is explained. The adjustment portion 94 of the variable drop start timing mechanism 90 comprises a vertical groove 104 extending in the axial direction (up-down direction) of the float 88, disposed to penetrate the outside perimeter surface and inside perimeter surface of the float 88 outside the cylinder 88*b*, and horizontal grooves 106 extending leftward of this vertical groove 104. The adjustment portion 94 further comprises a raised portion 108, disposed on the outside perimeter surface of the side wall 102, insertable into the vertical groove 104 and the horizontal grooves 106 of outside cylinder 88*b* on float 88. Here, multiple (five, specifically) horizontal grooves 106 are disposed at predetermined spacing and at differing height positions along the axial direction of the float 88. Related to this, from one to five lines extending in the horizontal direction (lateral direction) are drawn corresponding to the position of the five horizontal grooves 106 on the outside cylinder 88*b* of the float 88; when the raised portion 108 is inserted into a horizontal groove 106, the line at the corresponding position is placed immediately above the top edge of the outside cylinder 98 and can be seen from outside (see FIGS. 21, 22).

Figure 20:
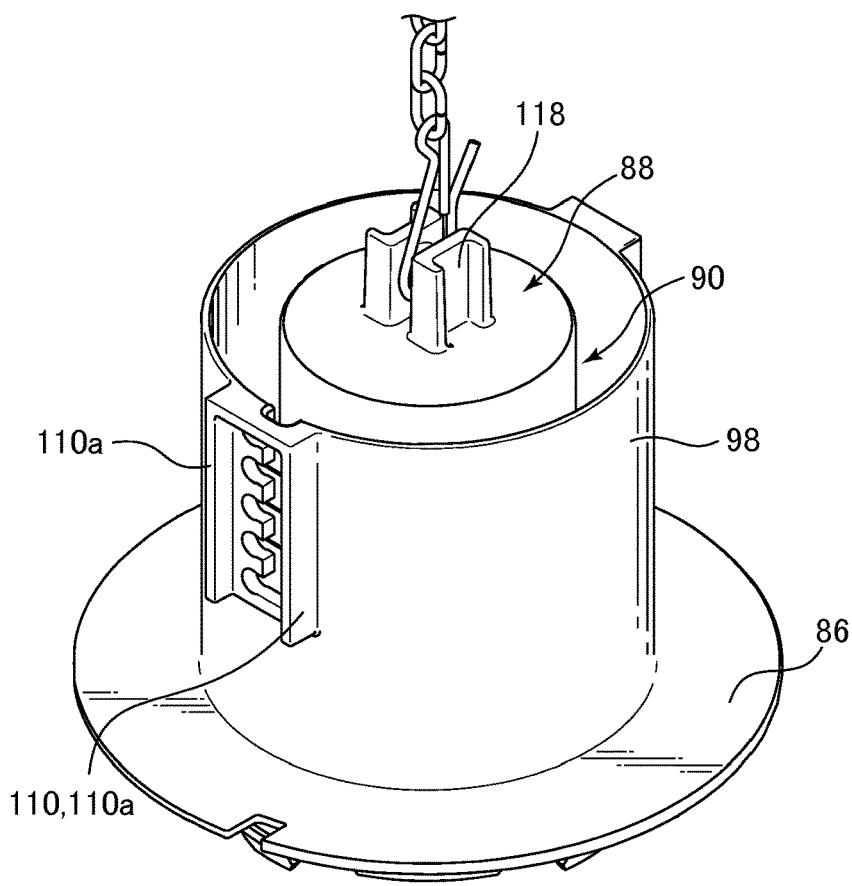
FIG. 20 is a perspective view showing a valve body, float, and part of a drop start timing adjustment mechanism in a discharge valve apparatus according to the second embodiment of the present invention.
Figure 21:
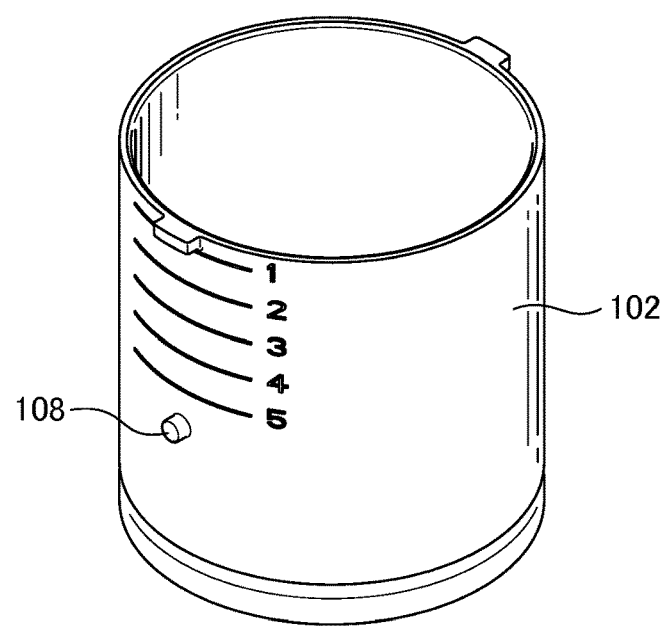
FIG. 21 is a perspective view showing the side wall of the reservoir portion of the variable drop start timing mechanism in a discharge valve apparatus according to the second embodiment of the present invention.

Next, as shown in FIGS. 16 and 20, a wall portion 110 surrounding the vertical groove 104 and the horizontal grooves 106 and projecting horizontally outward is disposed in the area formed by the vertical groove 104 and the horizontal grooves 106 on the float 88 outside the cylinder 88*b*. The two sides 110*a* of this wall portion 110 extend along the axial direction (up-down direction) of the float 88. The outward tip portion of this wall portion 110 is formed to be positioned further outside than the vertical groove 104, the horizontal grooves 106, and the raised portion 108, which form the adjustment portion.

In the embodiment, a raised portion 108 is formed on the side wall 102 of the reservoir portion 92, and the vertical groove 104 and the horizontal grooves 106 are formed on the float 88 outside the cylinder 88b, but it is also acceptable, conversely, to form vertical channels and horizontal channels in the side wall 102 of the reservoir portion 92, and form a raised portion on the outside the cylinder 88b of the float 88.

Figure 18:
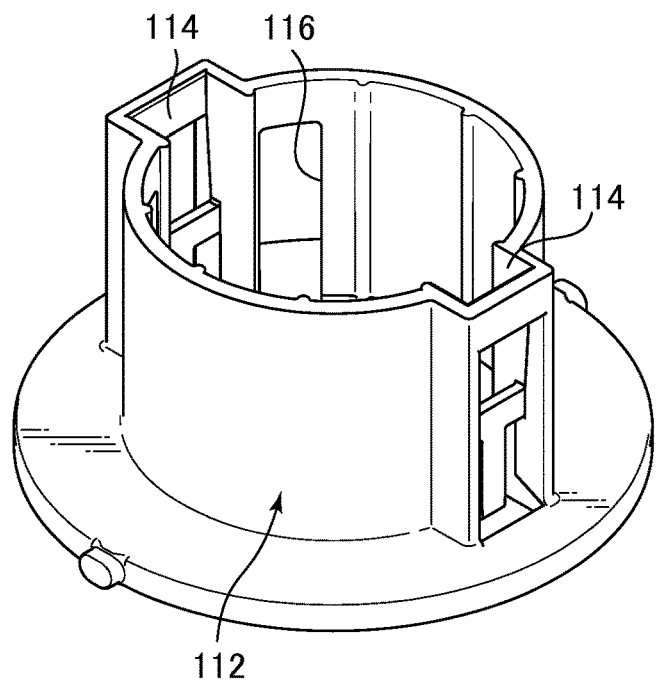
FIG. 18 is a perspective view showing the guide portion which guides the valve body in a discharge valve apparatus according to the second embodiment of the present invention.
Figure 19:
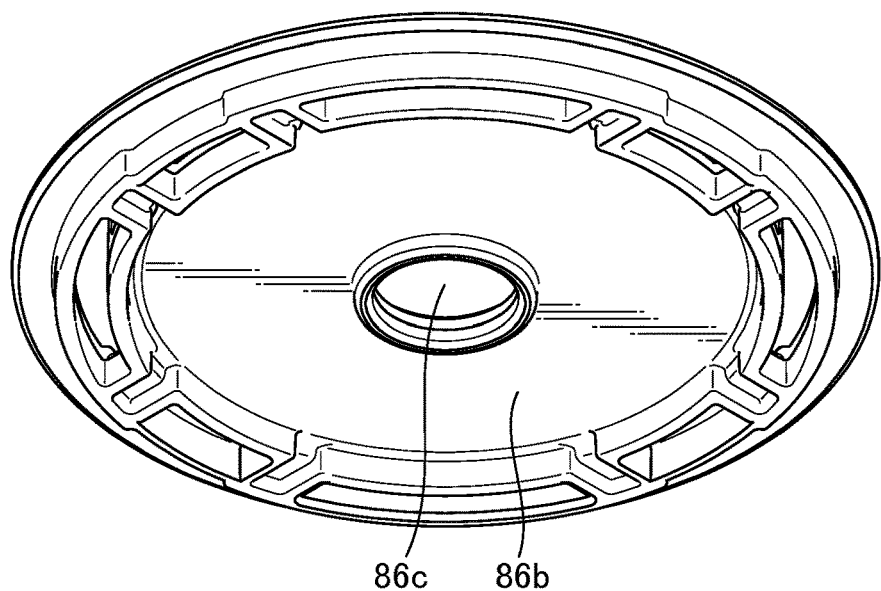
FIG. 19 is a cross section view showing a packing support member in a discharge valve apparatus according to the second embodiment of the present invention.

Here, referring to FIGS. 11, 12, and 18, the guide portion 112 of the discharge valve apparatus 80 is explained. As shown in FIGS. 11 and 12, the guide portion 112 is disposed on the pedestal 82. As shown in FIG. 18, the guide portion 112 is formed in a cylindrical shape into which the float 88 outside the cylinder 88b can be inserted. The guide channels 114, which project outward and extend up and down, are formed in two opposing locations on the outside perimeter surface of the guide portion 112. The above-described wall portion 110, formed on the outside of the outside cylinder 88b on the float 88, is inserted through a tiny gap into these guide channels 114 of the guide portion 112, guiding the up and down movement of the reservoir portion 92. The up and down movement of the valve body 86 is stabilized by the guide portion 112.

As shown in FIG. 18, two openings 116 extending in the up-down direction along the guide channels 114 are formed on both sides of one of the guide channels 114 on the guide portion 112 (see FIG. 13). The openings 116 are formed in an essentially rectangular shape. The openings 116 are formed in the guide portion 112, therefore if there is flush water in excess of the set stored water amount inside the guide portion 112, that excess flush water can be made to flow out from the openings 116. The amount of stored water in the reservoir portion 92 is thus stabilized. Because the wall portion 110 formed on the outside of the reservoir portion 92 outside the cylinder 98 is inserted into the guide channels 114 extending in the up-down direction of the guide portion 112, movement in the perimeter direction by the valve body 86 and the float 88 is restricted.

Here the surface area of the openings 116, as in the first embodiment, is formed to have a size such that the flush water level inside the guide portion 112 drops down at essentially the same speed as the flush water level inside the reservoir tank 18.

Next, referring to FIG. 22, an operation for adjusting the projection height of the side wall 102 on the reservoir portion 92 using the variable drop start timing mechanism 90 on the discharge valve apparatus 80 according to a second embodiment is explained. As one example, the operation by the variable drop start timing mechanism 90 when a discharge valve apparatus 80 set to the high DWL setting on the left side is changed to a discharge valve apparatus 80 set to the low DWL setting on the right side is explained.

In the discharge valve apparatus 80 set to the left side high DWL setting, the raised portion 108 on the side wall 102 of the reservoir portion 92 is inserted in the highest position horizontal groove 106 on the outside cylinder 88b of the float 88, and the side wall 102 is at the highest projection height position. At this point, the flush water amount discharged from the discharge opening 32 is at its lowest level.

From a state in which the raised portion 108 on the side wall 102 of the reservoir portion 92 is pushed into the highest horizontal grooves 106 on the float 88 outside the cylinder 88b, the side wall 102 is rotated clockwise when seen from above, and the raised portion 108 is moved in the horizontal direction to the vertical groove 104; the side wall 102 is then pushed from above and drops down to the lowest level horizontal groove 106; furthermore the side wall 102 is rotated in the counterclockwise direction as seen from above, and the raised portion 108 is pushed into the bottom-most horizontal groove 106, by which means the projection height of the side wall 102 of the reservoir portion 92 is placed at its lowest position. At this point the flush water amount discharged from the discharge opening 32 is at its maximum.

Next, referring to FIGS. 16 and 17, a string body attachment portion for attaching the bead chain 30, which is a connecting member connected to the float 88 is explained. A bead chain attaching portion 118, being a connecting member attaching portion for attaching the bead chain 30, is disposed at essentially the middle of the top surface of the float 88. This bead chain attaching portion 118 comprises a pair of the vertical members 118a extending in the up-down direction, and a horizontal member 118b for connecting these vertical members 118a. A ring portion 30a at the bottom end of the bead chain 30 is inserted into this horizontal member 118b. This ring portion 30a at the bottom end of the bead chain 30 extends essentially parallel to the respective inside surfaces 118b of the vertical members 118a. For this reason, the inside surfaces 118b of the vertical members 118a function as a rotation restriction portion for restricting the rotational direction of the ring portion 30a of the bead chain 30 to one direction.

In this way, the inside surfaces 118b on the vertical members 118a restrict the rotational direction of the ring portion 30a of the bead chain 30 to one direction, so that interference between the bead chain 30 and internal members of the reservoir tank, and tangling of the bead chain 30 itself, can be prevented.

Next, an operation of the discharge valve apparatus 80 according to a second embodiment is the same as the discharge valve apparatus according to the first embodiment explained with reference to FIG. 5 and FIGS. 6 through 10.

For this reason, in the discharge valve apparatus 80 according to a second embodiment, the timing at which the valve body 86 starts to drop can be varied in the same way as the discharge valve apparatus of the first embodiment, therefore the opening time of the discharge opening 32 can be variable, the amount of flush water to the toilet can be variable, and the amount of flush water can be adjusted according to toilet type.

Below, the operational effect resulting from the discharge valve apparatuses 24 and 80 of the first embodiment and/or second embodiment of the present invention will be explained.

First, using the discharge valve apparatuses 24, 80 according to the embodiments of the present invention, the variable drop start timing mechanisms 50, 64, and 90 for varying the timing at which the drop of the valve bodies 42 and 86 starts are attached to the floats 48 and 88, which are attached to the valve bodies 42 and 86 and drop in tandem with the drop in the flush water level inside the reservoir tank, therefore the timing at which the valve bodies 42 and 86 start to drop can be varied. As a result, in the discharge valve apparatuses 24 and 80 of the present embodiment the time over which flush water is discharged from the discharge opening 32 can be changed, and since the flush water volume discharged from the discharge opening can be changed, [the apparatus] can be attached to toilets of other types and the flush water volume easily adjusted.

The discharge valve apparatuses 24 and 80 of the present embodiment provide a buoyancy adjustment mechanism on the floats 48 and 88, therefore the timing at which the valve bodies 42 and 86 start to drop can be varied using a simple mechanism.

In the discharge valve apparatuses 24 and 80 of the present embodiment, the variable drop start timing mechanisms 50, 64, and 90 comprise the reservoir portions 58, 92 and the adjustment portions 60, 66, and 94 for adjusting the amount of flush water stored in the reservoir portions 58, 92, therefore the amount of flush water stored in the reservoir portions 58, 92 functioning as weights can be adjusted using the adjustment portions 60, 66, and 94 to easily adjust the buoyancy acting on the floats 48 and 88.

In the discharge valve apparatuses 24, 80, the heights of the side walls 58a, 102 on the reservoir portions 58, 92 can be changed to adjust flush water amounts using the adjustment portions 60, 66, and 94 on the variable drop start timing mechanisms 50, 64, and 90, therefore the buoyancy acting on the floats 48 and 88 can be easily changed.

In the discharge valve apparatuses 24, 80 of the present embodiment, the side walls 58a, 102 on the reservoir portions 58, 92 of the variable drop start timing mechanisms 50, 64, and 90 are formed over the entire perimeters thereof, and flush water can be stored up to the top end portion thereof, even if stored flush water is emptied from the reservoir portions 58, 92, that flush water empties uniformly from the reservoir portions 58, 92, such that valve bodies 42 and 86 can be lowered without a loss of balance to the valve bodies 42, 86.

In the discharge valve apparatus 80 of the present embodiment, by inserting the raised portion 108, disposed on either the side wall 102, or the float 88, into one of the horizontal grooves 106 at multiple different height positions on the float 88 or on the side wall 102 of the reservoir portion 92, the height position of the top end portion of the side wall 102 on the reservoir portion 92 can be changed, so that changing the timing at which the valve body 86 starts to drop, as well as adjusting the buoyancy of the float 88, can be achieved by a simple structure.

In the discharge valve apparatus 80 of the present embodiment, a wall portion 110 extending outward to the vicinity of the adjustment portion 94 is formed on the perimeter surface of the float 88 or the side wall 102 of the reservoir portion 92, and the outside end of the wall portion 110 is positioned further outside than the adjustment portion 94, therefore the adjustment portion 94 can be prevented by the wall portion 110 from contacting some part and breaking off, and the weight of the weight can be reliably adjusted by adjusting the flush water amount in the reservoir portion 92 using the adjustment portion 94.

In the discharge valve apparatus 80 according to the present embodiment, the wall portion 110 is disposed to surround the adjustment portion 94, therefore breaking off by contact of the adjustment portion 94 can be reliably prevented.

In the discharge valve apparatus 80 according to the present embodiment, movement in the circumferential direction by the valve body 86 is regulated, therefore the bead chain 30 attached to the float 88 can be prevented from rotating and becoming twisted.

In the discharge valve apparatus 80 of the present embodiment, the reservoir portion 92 of the variable drop start timing mechanism 90 is formed around the float 88, therefore the entire apparatus can be made compact, with a low silhouette.

In the discharge valve apparatus 24 of the present embodiment, the adjustment portion 60 of the variable drop start timing mechanism 50 is disposed on float 48 and the side wall 58a of the reservoir portion 58, and is a screw mechanism 62, therefore the buoyancy acting on the float 48 can be changed using a simple mechanism, and the timing at which the valve body 42 starts to drop can be easily changed.

In discharge valve apparatuses 24, 80 of the present embodiment, the up-down movement of the valve bodies 42, 86 are guided by the guide portions 72, 112, therefore the up-down movement of the valve bodies 42, 86 can be stabilized. In addition, the openings 74, 116 for allowing flush water to flow out are formed on the circumferential surface into which the side walls 58a, 102 of the reservoir portions 58, 92 on the guide portions 72, 112 fit, therefore when, for example, the side walls 58a, 102 are set low, excess flush water exceeding the flush water amount set for the reservoir portions 58, 92 can be made to flow out even if flush water exceeding the height of the side walls 58a, 102 in the guide portions 72, 112 is held. As a result, in the present invention exactly the set buoyancy can be made to constantly act on the floats 48, 88, unaffected by the guide portions 72, 112, and the buoyancy of the floats 48, 88 can be maintained at essentially a fixed level.

In the discharge valve apparatuses 24, 80 of the present embodiment, the top end of the openings 74, 116 on the guide portions 72, 112 are formed to be positioned above the top end of the side walls 58a, 102 on the reservoir portions 58, 92 when the valve bodies 42, 86 reach the top-most position relative to the guide portion, therefore excess flush water exceeding the flush water amount set for the reservoir portions 58, 92 can be reliably caused to flow out from the openings, which enables the set buoyancy to constantly act on the floats 48, 88, such that the buoyancy of the float 48, float 88 can be kept essentially fixed.

In the discharge valve apparatuses 24, 80 of the present embodiment, the surface areas of the openings 74, 116 in the guide portions 72, 112 are set to a size such that the water level inside the guide portion drops at essentially the same speed as the drop in the water level inside the reservoir tank 18, therefore flush water exceeding the flush water amount set for the reservoir portion can be caused to flow out from the openings at essentially the same time as the water level inside the reservoir tank drops, and exactly the set buoyancy can be made to constantly act on the float, so that float buoyancy can be essentially maintained at a fixed level.

In the discharge valve apparatuses of 24, 80, the valve bodies 42, 86 comprise the seal portions 42a, 86a, and a part of the valve body is disposed to be positioned below the seal portion, therefore the apparatus as a whole can be made compact.

In the discharge valve apparatus 80 of the present embodiment, valve body 86 comprises a bottom surface, and the hole 86c is disposed in this bottom surface, therefore when flush water flows into the float 88, flush water can be removed from the hole 86c formed on the bottom surface of the valve body 86.

In the discharge valve apparatus 80 of the present embodiment, a bead chain attaching portion 118, to which the bead chain 30 which pulls up the valve body is attached, is itself attached to the top surface of the valve body 86; the direction of rotation by the bead chain 30 is restricted by this bead chain attaching portion to one direction, therefore interference between the connecting member and reservoir tank internal members, and tangling of the connecting member itself, can be prevented.

A reservoir tank apparatus 4 according to the present embodiment comprises the above-described discharge valve apparatuses 24, 80, therefore the flush water amount can be similarly adjusted.

A flush toilet 1 according to the present embodiment comprises the above-described reservoir tank apparatus 4, therefore the flush water amount can be adjusted.

What is claimed is:

1. A discharge valve apparatus attached to a reservoir tank in a reservoir tank apparatus for storing flush water, comprising:
   a valve body, attached to a top of a discharge opening provided in a bottom surface of the reservoir tank, for opening and closing the discharge opening by up and down movement thereof;
   a float, attached to the valve body, which drops in tandem with a drop in water level inside the reservoir tank; and
   a variable drop start timing mechanism to make a drop start timing of the valve body variable, the variable drop start timing mechanism being a buoyancy adjustment mechanism disposed on the float, the buoyancy adjustment mechanism including a reservoir portion, disposed on the float, for storing flush water, and an adjustment portion for adjusting a volume of the flush water stored in the reservoir portion, whereby a time over which the flush water is discharged from the discharge opening can be changed, and a volume of the flush water discharged from the discharge opening can be changed;
   wherein the reservoir portion of the variable drop start timing mechanism has a side wall erected on an outer perimeter side thereof, and the adjustment portion adjusts the flush water volume by changing a height of the side wall of the reservoir portion; and
   the reservoir portion adjustment portion of the variable drop start timing mechanism comprises differing channel portions at multiple height positions formed on the float or on the side wall of the reservoir portion, and a projecting portion capable of insertion in the channel portions provided on the side wall or float.

2. The discharge valve apparatus according to claim 1, wherein the reservoir portion side wall in the variable drop start timing mechanism enables storage of flush water up to a top edge portion formed around the entire perimeter thereof.

3. The discharge valve apparatus according to claim 1, wherein a wall portion extending outward close to the adjustment portion is formed on the float or on the perimeter surface of the reservoir portion side wall, and the outside edge of the wall portion is positioned outside the adjustment portion.

4. The discharge valve apparatus according to claim 3, wherein the wall portion is disposed to surround the adjustment portion.

5. The discharge valve apparatus according to claim 4, wherein movement in the circumferential direction of the wall portion is restricted so that the valve body does not rotate.

6. The discharge valve apparatus according to claim 1, wherein the reservoir portion of the variable drop start timing mechanism is formed around the float.

7. The discharge valve apparatus according to claim 1, wherein the discharge valve apparatus further comprises a guide portion for guiding the up and down motion of the valve body, the guide portion having a perimeter wall into which side walls of the reservoir portion are inserted, the perimeter wall being provided with openings for permitting flush water to flow out.

8. The discharge valve apparatus according to claim 7, wherein a top end of the guide portion opening is formed so that when the valve body reaches the highest position relative to the guide portion, it is positioned higher than a top edge of the reservoir portion side wall.

9. The discharge valve apparatus according to claim 7, wherein the surface area of the guide portion opening is set to a size such that a water level inside the guide portion drops at essentially the same speed as a drop in the water level inside the flush water tank.

10. The discharge valve apparatus according to claim 1, wherein the valve body comprises a seal portion for sealing the discharge opening, and a part of the valve body is positioned below the seal portion.

11. The discharge valve apparatus according to claim 1, wherein the valve body comprises a bottom surface, in which a hole is provided.

12. The discharge valve apparatus according to claim 1, wherein the discharge valve apparatus further comprises a connecting member attachment portion, to which a connecting member for pulling up the valve body to the top surface of the valve body, and the connecting member attachment portion comprises a rotation-limiting portion for limiting the rotational direction of the connecting member to one direction.

13. A reservoir tank apparatus comprising;
    a reservoir tank having a fluid outlet, and
    a discharge valve apparatus according to claim 1 mounted within the fluid outlet.

14. A toilet comprising the reservoir tank according to claim 13.

* * * * *